(12) United States Patent
Katase

(10) Patent No.: US 7,592,988 B2
(45) Date of Patent: Sep. 22, 2009

(54) DISPLAY DEVICE HAVING OPTICAL WAVEGUIDES AND LIGHT-EMITTING UNITS

(75) Inventor: Makoto Katase, Suwa (JP)

(73) Assignee: Seiko Epson Corporation (JP)

( * ) Notice: Subject to any disclaimer, the term of this patent is extended or adjusted under 35 U.S.C. 154(b) by 592 days.

(21) Appl. No.: 11/049,212

(22) Filed: Feb. 2, 2005

(65) Prior Publication Data

US 2005/0191020 A1    Sep. 1, 2005

(30) Foreign Application Priority Data

Feb. 3, 2004   (JP) ............... 2004-027344

(51) Int. Cl.
  *G09G 3/34* (2006.01)
  *G09G 3/36* (2006.01)
(52) U.S. Cl. ............... 345/84; 345/86; 345/87
(58) Field of Classification Search .......... 345/32, 345/129, 84, 86, 87; 349/86; 362/551; 385/129
  See application file for complete search history.

(56) References Cited

U.S. PATENT DOCUMENTS 5,300,942 A * 4/1994 Dolgoff .............. 345/32
5,828,431 A * 10/1998 Ando et al. ............ 349/86
5,839,813 A * 11/1998 Smith ................ 362/551
6,266,473 B1 * 7/2001 Saccomanno et al. ...... 385/140
6,559,827 B1 * 5/2003 Mangerson ............ 345/102

FOREIGN PATENT DOCUMENTS

| JP | 59-148030 | 8/1984 |
| JP | 11-109349 | 4/1999 |
| JP | 2001-282140 | 10/2001 |
| JP | 2002-014633 | * 1/2002 |

* cited by examiner

Primary Examiner—Chanh Nguyen
Assistant Examiner—Calvin C Ma
(74) Attorney, Agent, or Firm—Harness, Dickey & Pierce, P.L.C.

(57) ABSTRACT

A display device is provided that includes a display panel having a light-emitting unit for emitting light according to predetermined display data, an elongated optical waveguide unit which guides the light incident from the light-emitting unit and has a core layer and an addressing unit for selecting the light from the light waveguide unit according to the predetermined display data. The core layer is composed of light scattering liquid crystal, and the addressing unit allows the light to be emitted from a predetermined part of the optical waveguide unit by using the light scattering operation of the light scattering liquid crystal.

20 Claims, 25 Drawing Sheets

F I G. 3A
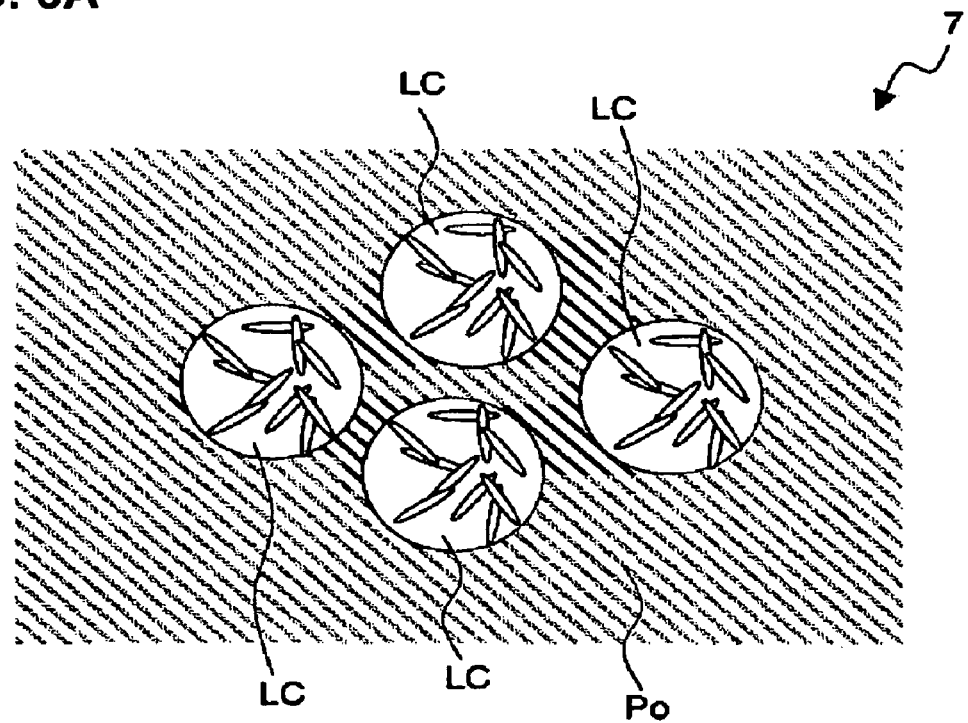
F I G. 3B
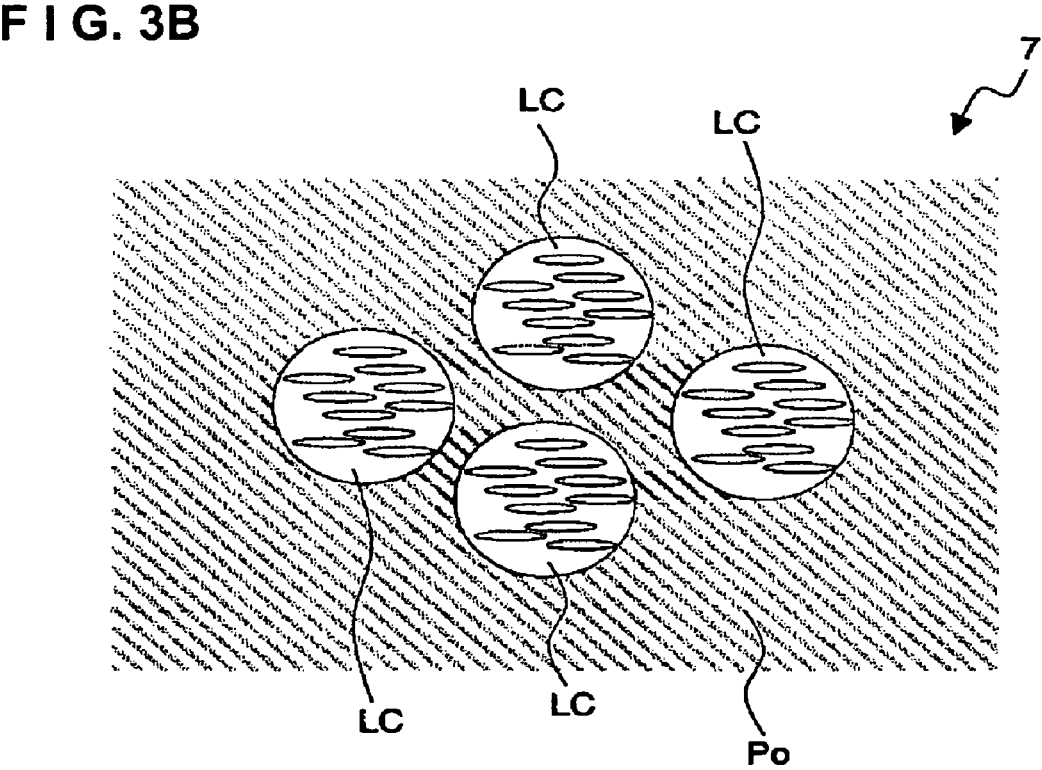

F I G. 9
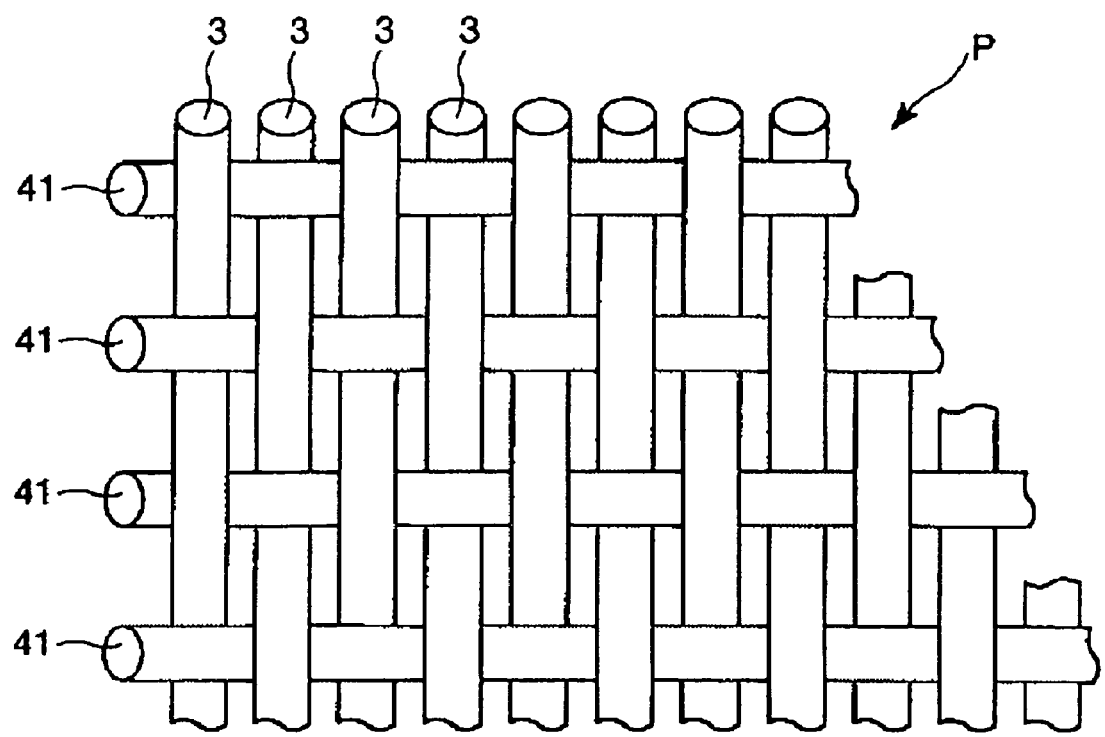

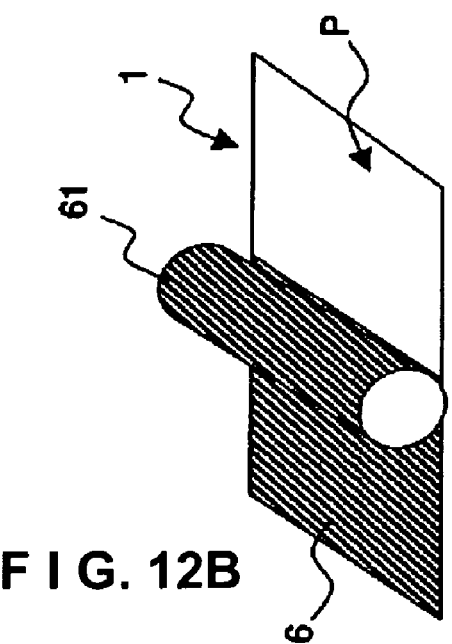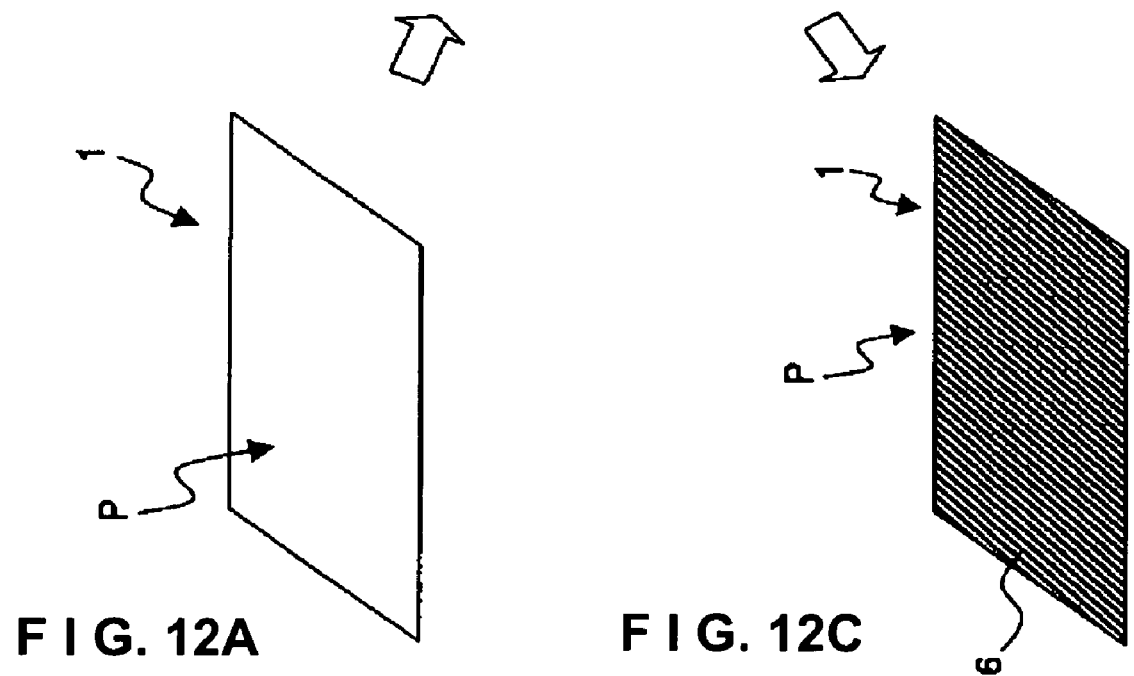
FIG. 12B
FIG. 12A  FIG. 12C

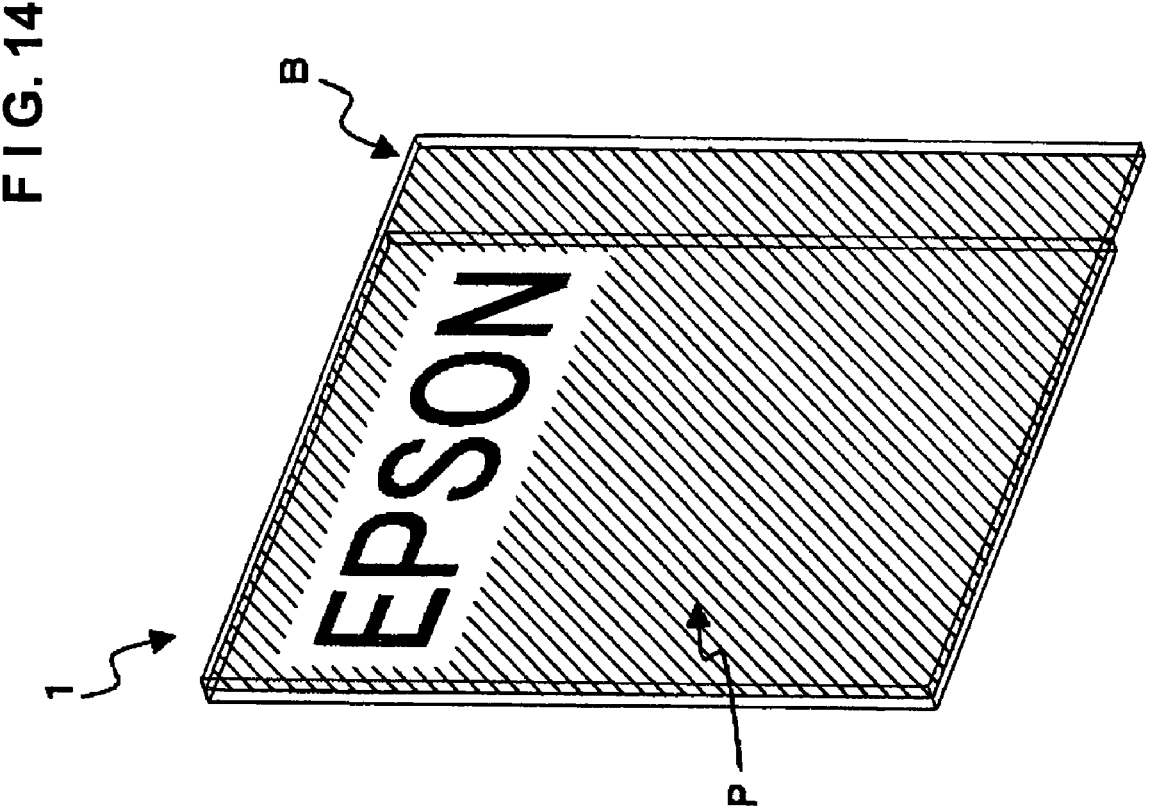

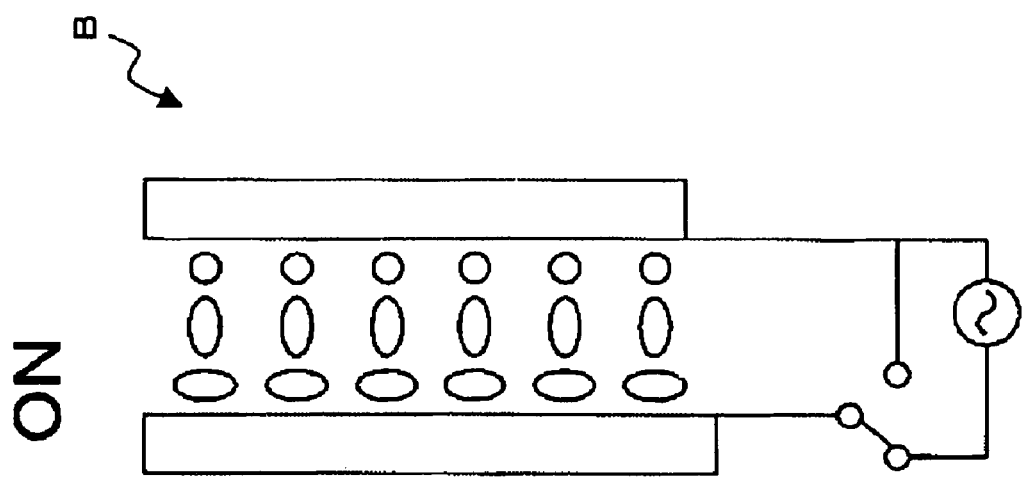
FIG. 15B ON
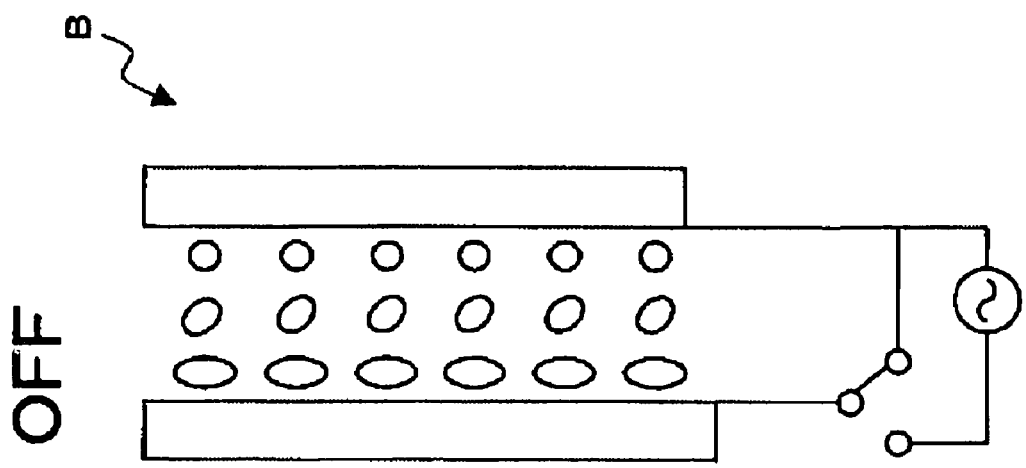
FIG. 15A OFF

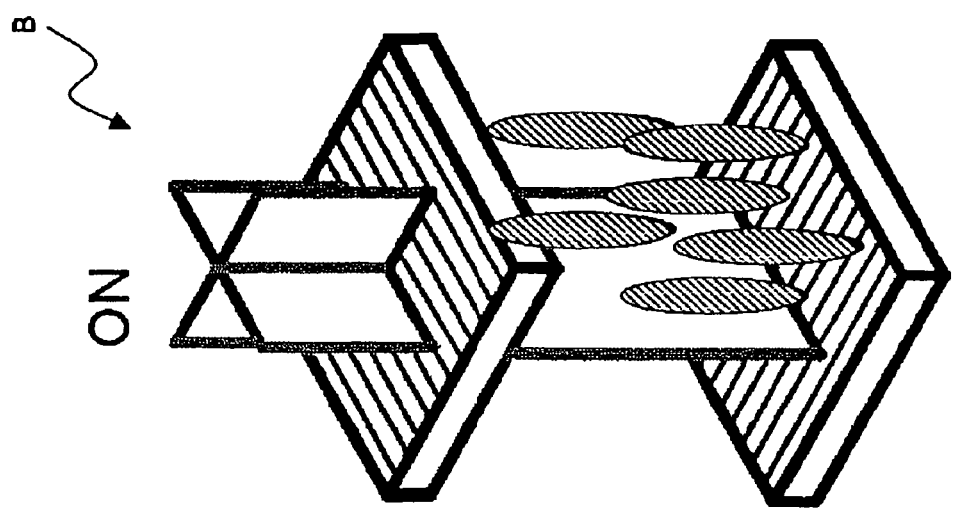
FIG. 16B ON
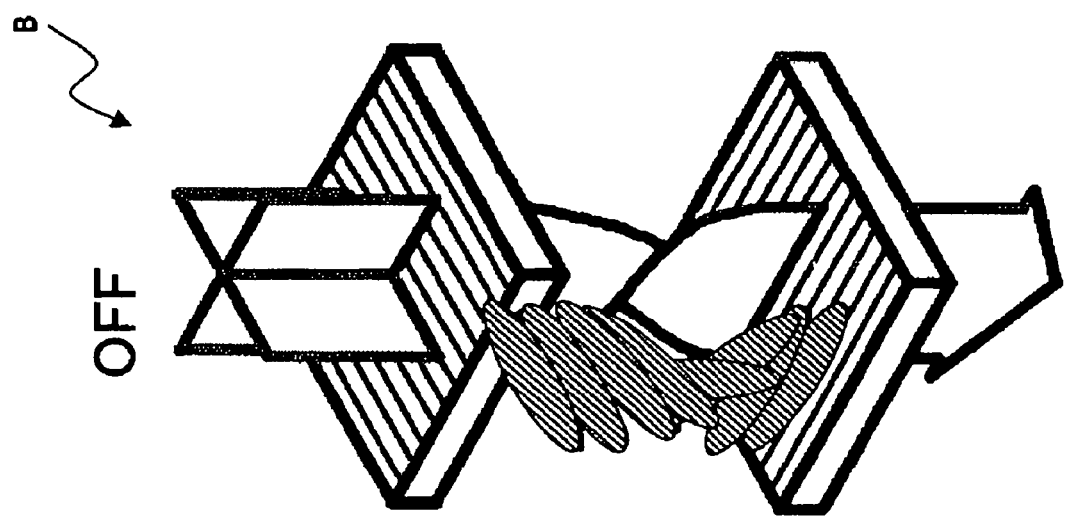
FIG. 16A OFF

F I G. 18A
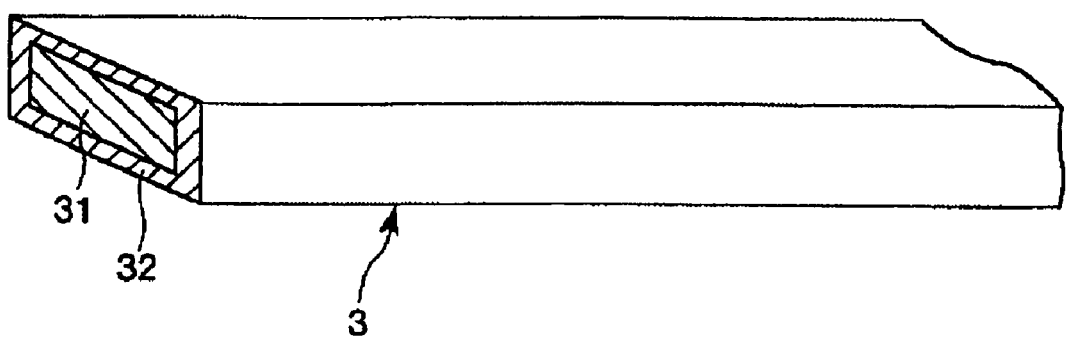
F I G. 18B
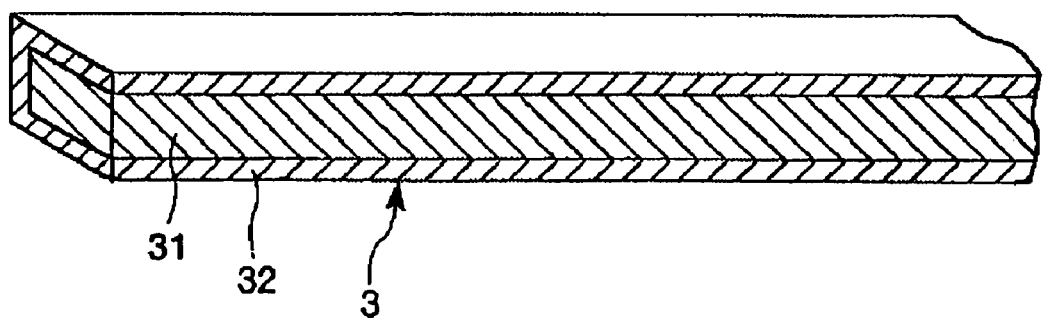

F I G. 19A
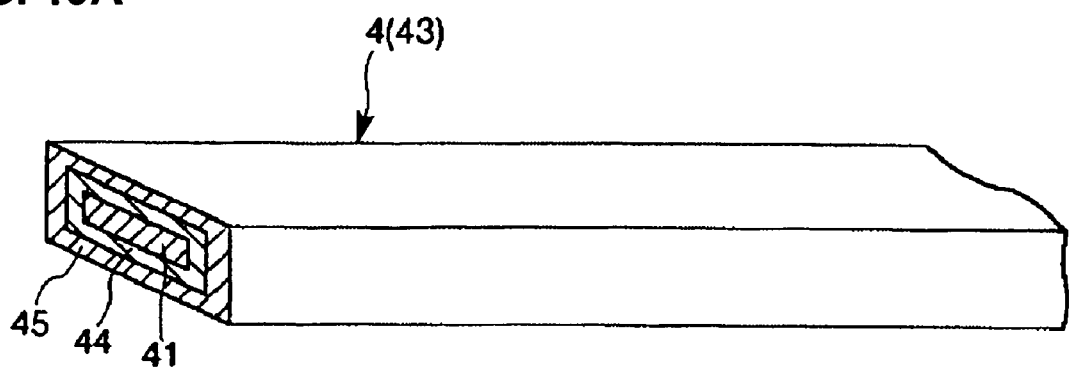
F I G. 19B
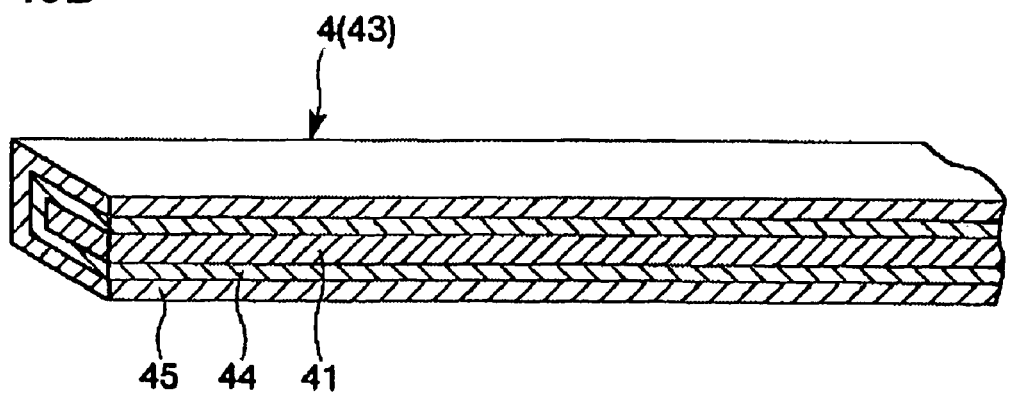

F I G. 20A
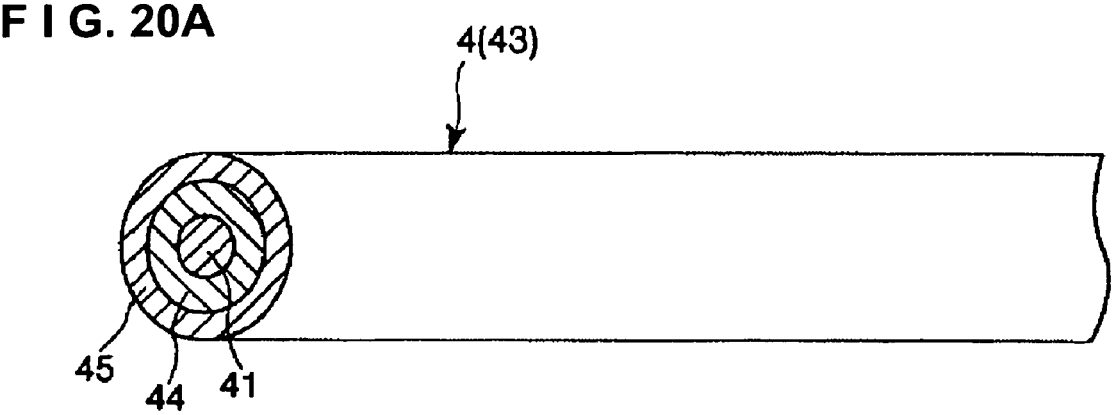
F I G. 20B
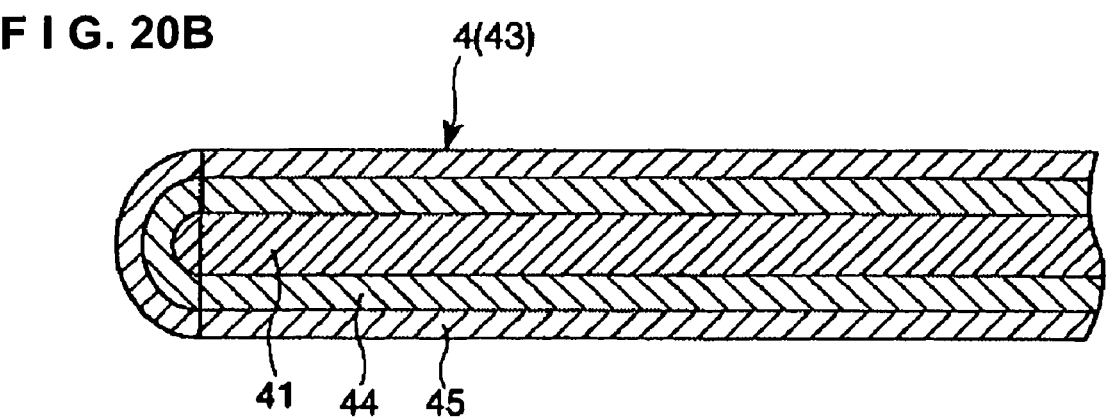

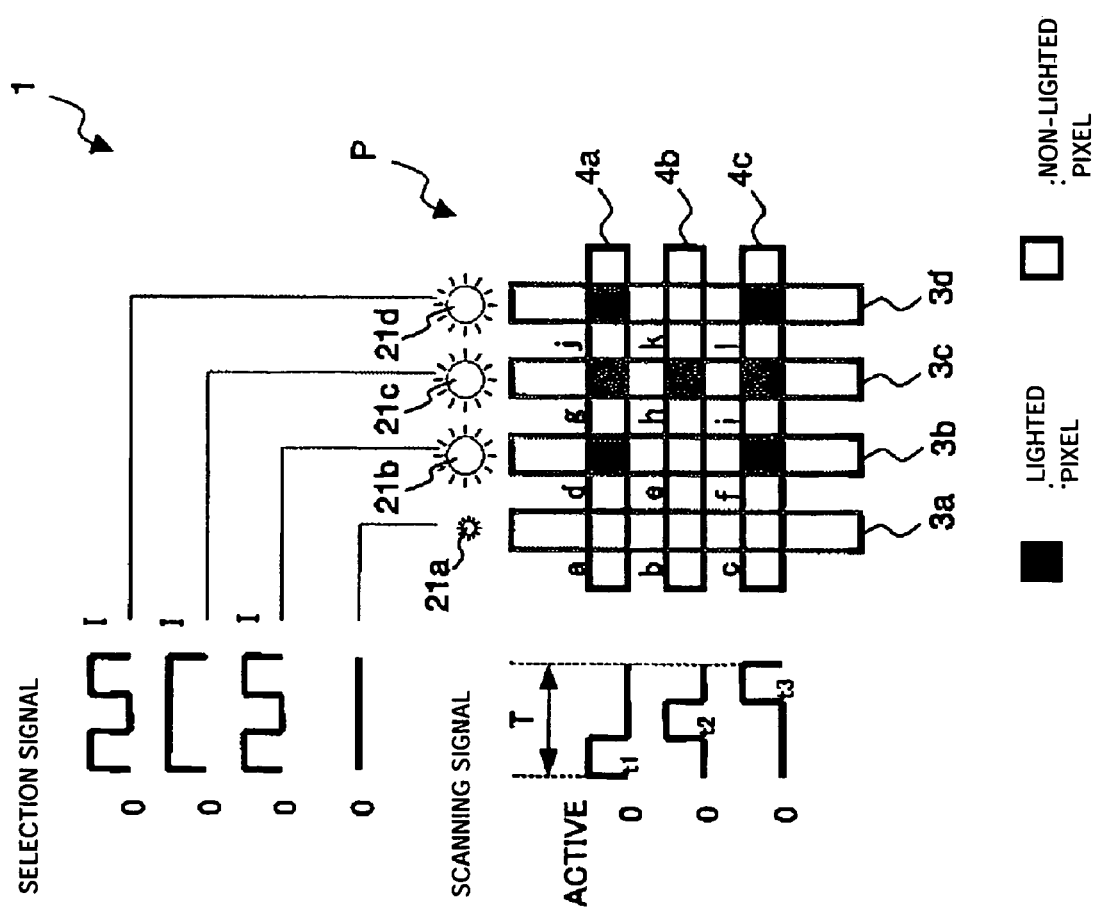

DISPLAY DEVICE HAVING OPTICAL WAVEGUIDES AND LIGHT-EMITTING UNITS

RELATED APPLICATIONS

This application claims priority to Japanese Patent Application No. 2004-027344 filed Feb. 3, 2004 which is hereby expressly incorporated by reference herein in its entirety.

BACKGROUND

1. Technical Field

The present invention relates to a display device.

2. Related Art

Conventionally, a display device has a refractive index changing unit provided on an external surface of an optical waveguide (optical fiber). The refractive index changing unit has the optical waveguide arranged therebetween and applies a voltage to the optical waveguide when the display device is driven. In this case, at a part of the optical waveguide to which the voltage is applied, the reflective index is changed by a Kerr effect, and the light transmitted to the optical waveguide is guided to the outside of the optical waveguide. As a result, the display panel emits the light (for example, see Japanese Patent Laid-Open No. 59-148030)).

In the above conventional display device, by changing the refractive index of the optical waveguide, the light is guided from the optical wave guide. However, according to the structure of the conventional display device, since the guided light has directivity in a specific direction due to the refractive index of the optical waveguide, there is a problem in that the viewing angle of the display panel becomes small. For this reason, even though the above technology is known in the optical waveguiding display device, such an optical waveguiding display device has not been put to practical use and has not been commercialized.

Accordingly, the present invention is designed to solve the above problems, and it is an object of the present invention to provide a display device capable of improving the viewing angle characteristic of a display panel.

SUMMARY

According to a first aspect of the present invention for solving the above-mentioned problems, there is provided a display device comprising a display panel having a light-emitting unit for emitting light according to predetermined display data, an elongated optical waveguide unit for guiding the light emitted from the light-emitting unit and having a core layer and an addressing unit for selecting the light from the light waveguide unit according to the predetermined display data, wherein the core layer is composed of a light scattering liquid crystal, and the addressing unit allows the light to be emitted from a predetermined part of the optical waveguide unit by using a light scattering operation of the light scattering liquid crystal.

Thereby, it is possible to improve the viewing angle characteristic or brightness characteristic of the display panel.

According to a second aspect of the present invention, there is provided a display device comprising a display panel having a light-emitting unit for emitting light according to predetermined display data, a plurality of elongated optical waveguide unit for guiding the light emitted from the light-emitting unit and having a core layer and an addressing unit for selecting the light from the light waveguide unit according to the predetermined display data, wherein the core layer is composed of a light scattering liquid crystal, and the addressing unit allows the light to be emitted from a predetermined part of the optical waveguide unit by using a light scattering operation of the light scattering liquid crystal.

Thereby, it is possible to improve the viewing angle characteristic or brightness characteristic of the display panel.

In the display device according to a third aspect of the present invention, the plurality of optical waveguide unit and at least part of the addressing unit are arranged in a matrix.

Thereby, it is possible to easily construct the display region.

In the display device according to a fourth aspect of the present invention, the plurality of optical waveguide unit and at least part of the addressing unit are arranged in a fabric shape.

Thereby, it is possible to implement the latest advancements in the field of fiber technology to manufacture the display panel.

In the display device according to a fifth aspect of the present invention, a surface of the display panel is covered with a transparent material.

Thereby, since the scattering of the light of the display panel is suppressed, it is possible to improve the display quality (contrast, uniformity of the brightness, visibility and the like) of the display device.

In the display device according to a sixth aspect of the present invention, preferably, a back surface layer for absorbing light is provided on a back surface of the display panel.

Thereby, since the reflected light (light scattering) is reduced on the display panel, it is possible to improve the display quality (contrast, uniformity of the brightness, visibility and the like) of the display device.

In the display device according to a seventh aspect of the present invention, a back surface layer is provided on a back surface of the display panel, and the back surface layer is constructed so as to select a transmitting state that transmits the light incident on the display panel from the outside or an absorbing state that absorbs the same.

Thereby, since a plurality of functions can be applied to the display device by changing the characteristic of the back surface layer, proper functions according to various scenes can be selected by using one display device.

In the display device according to an eighth aspect of the present invention, the optical waveguide unit has a clad layer to cover the circumference of the core layer.

Thereby, it is possible to further improve the viewing angle or brightness of the display panel.

In the display device according to a ninth aspect of the present invention, preferably, the addressing unit is multiplex driven.

Thereby, it is possible to efficiently drive the display device.

In the display device according to a tenth aspect of the present invention, preferably, the light-emitting unit allows a red light component, a green light component, and a blue light component to be incident on the optical waveguide unit.

Thereby, it is possible to achieve color display.

In the display device according to an eleventh aspect of the present invention, a fluorescent layer having a fluorescent material is provided on at least part of the display panel from which the light is selected.

Thereby, it is possible to efficiently achieve color display.

BRIEF DESCRIPTION OF THE DRAWINGS

FIGS. 3A and B are explanatory diagrams illustrating characteristics of light scattering liquid crystal.

FIG. 9 is a diagram illustrating a modification example of the display device shown in FIG. 1.

FIGS. 12A-C are diagrams illustrating a modification example of the display device shown in FIGS. 9 to 11.

FIG. 14 is a diagram illustrating a modification example of the display device shown in FIG. 1.

FIGS. 15A and B are explanatory diagrams illustrating the drive control of a back surface layer.

FIGS. 16A and B are explanatory diagrams illustrating the drive control of the back surface layer.

FIGS. 18A and B are diagrams illustrating the column elements of the display panel shown in FIG. 17.

FIGS. 19A and B are diagrams illustrating the row elements of the display panel shown in FIG. 17.

FIGS. 20A and B are diagrams illustrating a modification example of the addressing unit shown in FIG. 17.

FIG. 21 is an explanatory diagram illustrating the operation of the display device shown in FIG. 17.

DETAILED DESCRIPTION

Hereinafter, a display of the present invention will be described in detail based on preferred embodiments illustrated in the accompanying drawings.

First Embodiment

Figure 1:
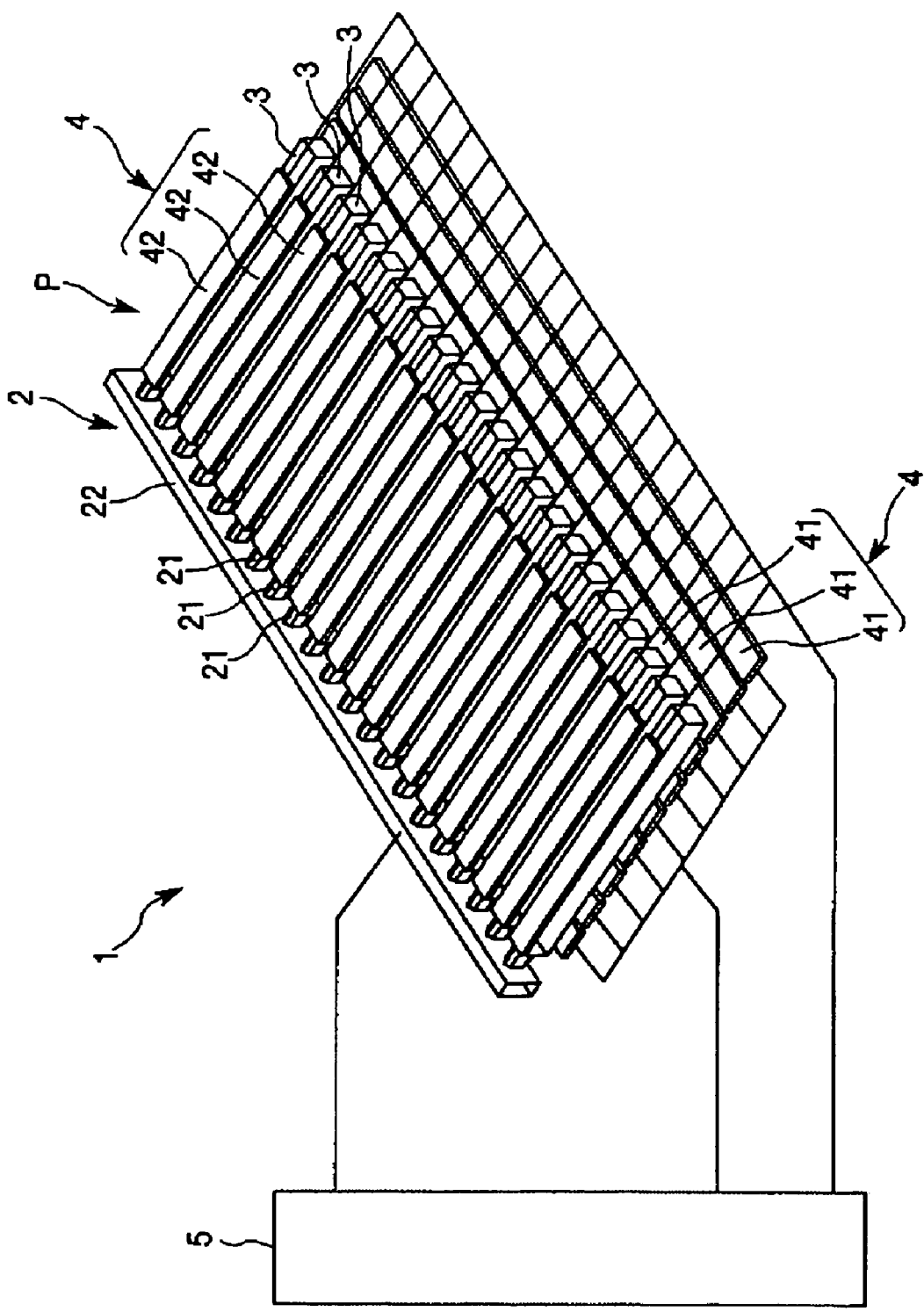
FIG. 1 is a perspective diagram illustrating a display device according to a first embodiment of the present invention.
Figure 2A:
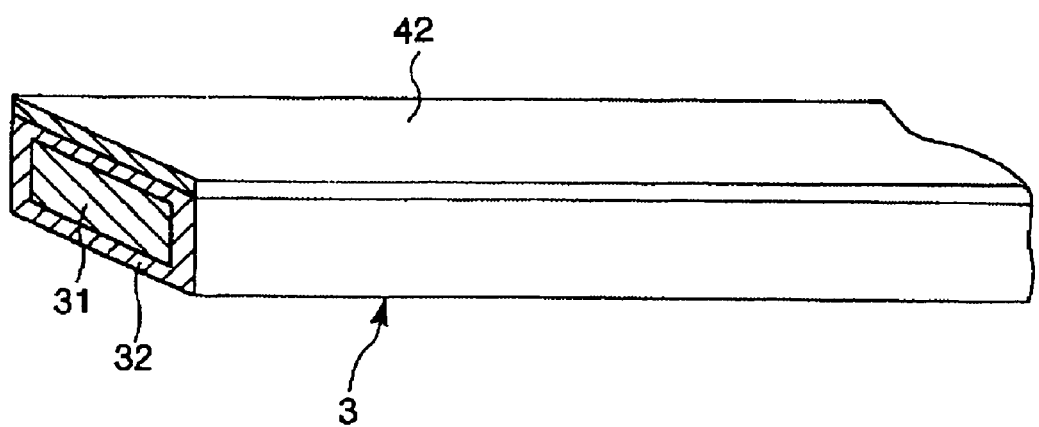
FIGS. 2A and B are diagrams illustrating column elements of the display panel shown in FIG. 1.
Figure 2B:
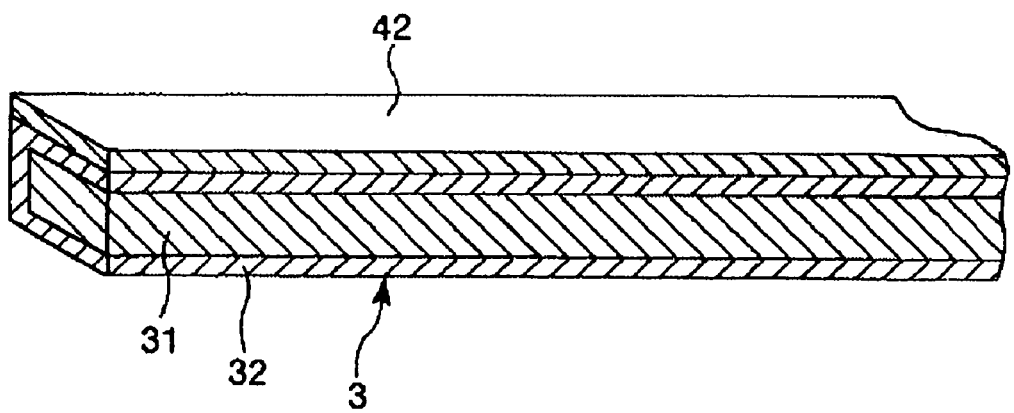

FIG. 1 is a perspective diagram illustrating a display device according to a first embodiment of the present invention. FIG. 2 is a diagram illustrating a column element of the display panel shown in FIG. 1. FIG. 2A is a perspective diagram of the column element of the display device and FIG. 2B is a cross-sectional view of the column element of the display device. The display device 1 is a flat-panel display device which is, for example, applied to electronic apparatuses such as a personal digital assistant, a game machine, a cellular phone, a personal computer, a television and the like.

Structure of Display Device

The display device comprises a light-emitting unit 2, optical waveguide units 3, addressing units 4, and a control unit 5. In the display device 1, each optical waveguide unit 3 comprises a light scattering liquid crystal 7 which will be described below, so that it is possible to improve the viewing angle of the display panel.

The light-emitting unit 2 has a plurality of light-emitting elements 21. These light-emitting elements 21 are arranged in a line on a frame member 22 so as to correspond to the plurality of light waveguide unit 3 which will be described below (see FIG. 1). For example, an LED (light-emitting diode) or organic EL (organic electro luminescence) is employed as the light-emitting element 21. The light-emitting unit 2 is connected to the control unit 5 such that the driving of the light-emitting unit 2 is controlled by the control unit 5. In addition, the light-emitting unit 2 makes the light-emitting elements 21 emit light based on a light-emitting signal according to predetermined display data and makes the emitted light be incident on the respective corresponding light waveguide unit 3.

Here, the display data is image data which is displayed on the display device 1, and may be binary data or gray scale data. When the display data is binary data, the luminous intensity of the light-emitting element 21 is adjusted based on the gray scale data functioning as the display data. The gray scale data may be frame gray scale data for controlling the luminous intensity of the light-emitting element by overlapping a screen fro each frame or a pulse gray scale data for adjusting the light-emitting time during a selection period. In addition, a selection signal is a signal for selecting a pixel which should be turned on among a plurality of pixels of the display device 1 and is scanned trough a scanning signal input to the addressing units 4. As a result, the light functioning as the image signal is selected from the optical waveguide units 3, the pixels are turned on, and the display device 1 is driven. The driving of the display device 1 will be described below.

The optical waveguide units 3 are elongated optical waveguides for guiding the light incident from the light-emitting unit 2 and constitute a column element of a display panel P. Each of the optical waveguide units 3 is composed of fiber members which have a square pillar shape and have flexibility to be bent and rolled. Each optical waveguide unit 3 has a core layer 31 for guiding the light and a clad layer 32 which is provided at the exterior of the core layer 31 and has a refractive index lower than that of the core layer 31 (see FIG. 2). The plurality of optical waveguide units 3 are configured as one set corresponding to the number of the light-emitting elements 21 and are regularly arranged on a plane on the entire surface of the display region (see FIG. 1). In addition, one end of each light waveguide unit 3 is arranged so as to be located at the side of the corresponding light-emitting element 21. Each light waveguide unit 3 functions to guide the light emitted from the light-emitting unit 2 (each corresponding light-emitting element 21) therein and propagate the light from one end of the optical waveguide unit 3 to the other end of the optical waveguide unit 3. In addition, since the light incident in the optical waveguide unit 3 progresses while totally reflecting inside the optical waveguide unit 3 in a normal state, the light is not emitted from the middle portion of the optical waveguide unit 3 to the outside.

Here, in the display device 1, the core layer 31 of each optical waveguide unit 3 is composed of light scattering liquid crystal 7. The light scattering liquid crystal 7 is a liquid crystal material having a characteristic that the light passing through the inside of the liquid crystal is scattered by the electric field or vibration applied from the outside. For example, the liquid crystal material may be polymer dispersed liquid crystal (PDLC) or polymer network liquid crystal (PNLC).

FIG. 3 is an explanatory diagram illustrating a characteristic of the light scattering liquid crystal 7. In the display device 1, for example, the light scattering liquid crystal 7 is composed of the polymer dispersed liquid crystal. As shown in FIG. 3, the light scattering liquid crystal 7 has a structure that liquid crystal molecules LC are scattered in a matrix of a polymer Po in a phase separation state.

When the electric field (or the vibration, the same in the following description) is not applied to the light scattering liquid crystal 7, the light scattering liquid crystal 7 is arranged such that the alignment vector is in a non-uniform direction for each liquid drop of the dispersed liquid crystal molecule LC and is in an opaque white state (see FIG. 3A). In this state, since the refractivity of the liquid crystal molecule LC is different in the horizontal direction and the vertical direction with respect to the orientation vector, the refractivity of the light is different in the polymer Po and the liquid crystal molecule LC. For this reason, the light is scattered on the interface due to the difference of the refractivity between the polymer Po and the liquid crystal molecule LC (light scattering operation).

On the other hand, when a voltage is applied to the light scattering liquid crystal 7, the liquid crystal molecule LC is arranged in a direction in which the electric field is applied, so that the light scattering liquid crystal 7 becomes transparent (see FIG. 3B). If so, since the refractivity of the polymer Po is substantially the same as that of the liquid crystal molecule LC, the light is weakly scattered on the boundary and the light is transmitted (light transmitting operation).

Each addressing unit 4 is composed of row electrodes 41 and column electrodes 42 and emits the light (image signal) in the optical waveguide units 3 from a predetermined location to the outside by the operation described below.

The row electrodes 41 are made of a conductive material, such as a metal or carbon, and have a fiber shape like a plate shape. In addition, each of the row electrodes 41 has flexibility so as to be bent or rolled. In addition, the plurality of row electrodes 4 is regularly arranged in a plane over the entire surface of the display region of the display device 1 such that their longitudinal directions cross (are orthogonal to) the optical waveguide units 3, and constitute the row element of the display panel P (see FIG. 1). In addition, each of the row electrodes 41 is connected to the control unit 5, the voltage functioning as the scanning signal is applied (input) to the row electrode 41 from the control unit 5, and the driving of the row electrode 41 is controlled.

On the other hand, the column electrodes 42 are made of an opaque conductive material and are arranged as one body one by one on a surface of each optical waveguide unit 3 (see FIGS. 1 and 2). In addition, each of the column electrodes 42 has flexibility so as to be bent or rolled. In addition, the column electrodes 42 constitute the column element of the display panel P, together with the optical waveguide units 3. In addition, each of the column electrodes 42 is connected to the control unit 5 and is connected to a ground through the control unit 5. These row electrodes 41 and column electrodes 42 are arranged such that a corresponding optical waveguide unit 3 is interposed therebetween from back surface of the display panel P. In addition, when an electric field is applied between the row electrodes 41 and the column electrodes 42 according to predetermined display data, the light existing in the optical waveguide unit 3 is emitted from the intersection points of the row electrodes 41 and the column electrodes 42 to the outside by the operation which will be described below. As a result, the light functioning as the image signal is selected.

The control unit 5, for example, has a driving circuit other than an IC chip, and is connected to the light-emitting unit 2 and the addressing units 4. The control unit 5 inputs the light-emitting signal to the light-emitting unit 2 according to the predetermined display data and inputs the scanning signal to the addressing units 4 according to the predetermined driving method described below. The driving of the light-emitting unit 2 and the addressing units 4 is controlled by the control unit 5.

Operation of Display Device

Figure 4:
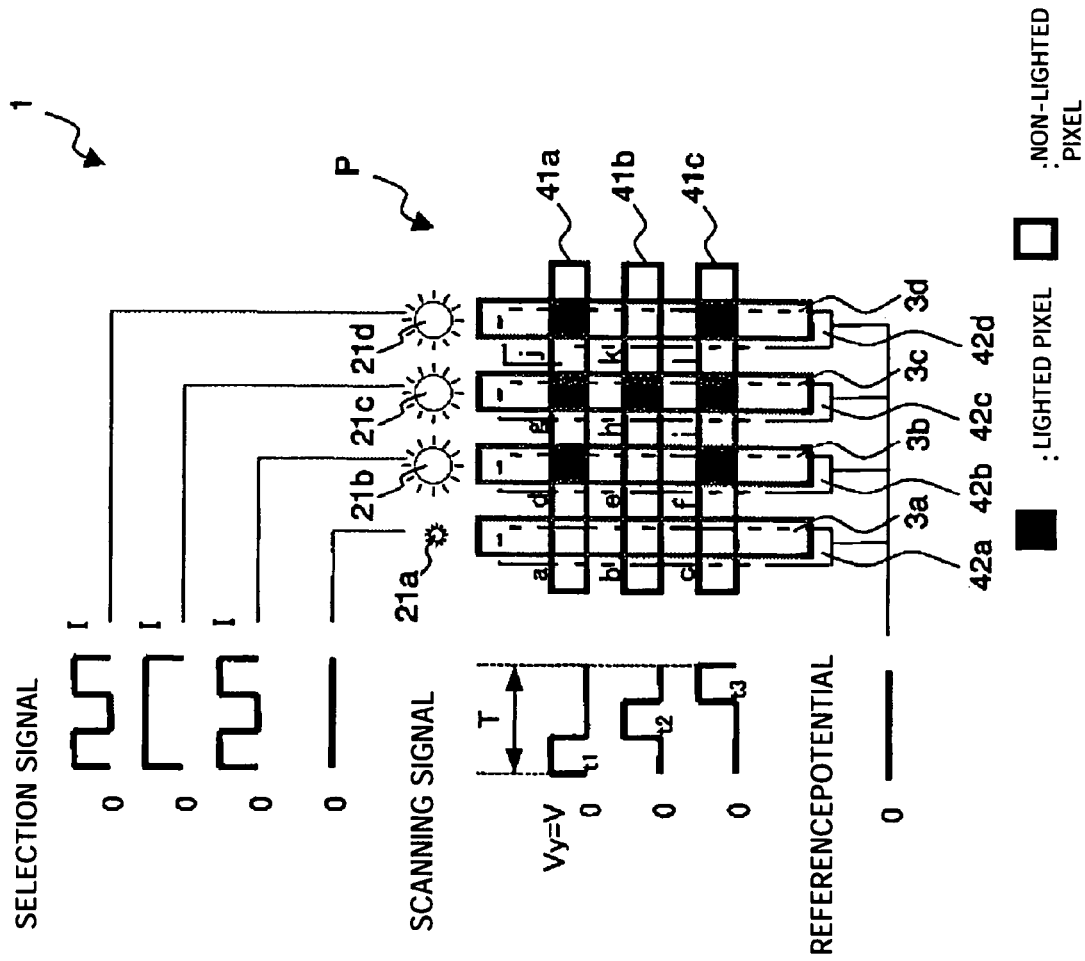
FIG. 4 is an explanatory diagram illustrating the operation of the display device shown in FIG. 1.
Figure 5:
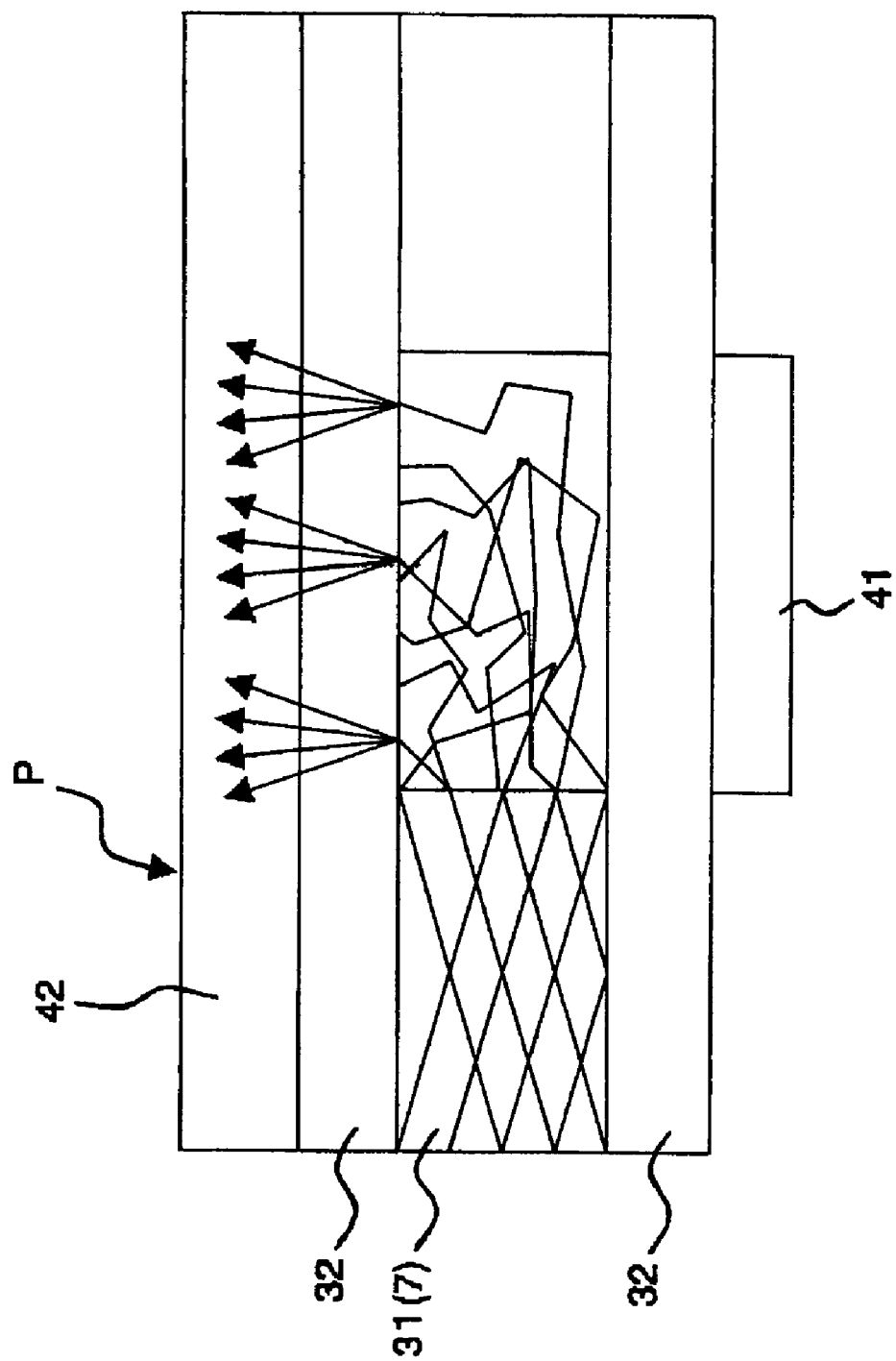
FIG. 5 is an explanatory diagram illustrating the operation of the display device shown in FIG. 1.

FIGS. 4 and 5 are explanatory diagrams illustrating the operation of the display device shown in FIG. 1. Here, as one example, the display device 1 including four column elements (optical waveguide unit 3a to 3d and the column electrodes 42a to 42d) and three row elements (row electrodes 41a to 41c) will be described. In other words, the display device 1 has a display region with twelve pixels (a to l) arranged in a matrix of four columns×three rows. In this example, the image that the pixels d, g, j, h, f, i, and l are turned on and the remaining pixels a, b, e, k, and c are not turned on is displayed on the display device 1 as the display data. In addition, the pixels of the display device 1 are respectively formed at the intersections of the row electrodes 41 and the column electrodes 42 on the optical waveguide units 3 and the number of the intersections of the row electrodes 41 and the column electrodes 42 is the same as that of the pixels of the display device 1.

In addition, in the display device 1, the multiplex driving (time division driving) is used for a driving method. In detail, since the number of scanning rows in the matrix is three, one period T is divided into the first to third scanning intervals t1 to t3 (see FIG. 4) and the scanning is performed by line-sequential driving. In addition, the pixels a, d, g, and j are scanned in the first scanning interval t1, the pixels b, e, h, and k are scanned in the second scanning interval t2, and the pixels c, f, i, and l are scanned in the third scanning interval t3.

In this display device 1, first, at an initial state, the reference electric potential (herein, 0 V) is applied to the column electrodes 42 of the addressing units 4. Next, when the light-emitting signal is input to the light-emitting unit 2 based on the predetermined display data, the light-emitting elements 21 are turned on or turned off according to the light-emitting signal. In addition, the light emitted from the light-emitting elements 21 is incident in the optical waveguide units 3 and progresses while totally reflecting inside the optical waveguide units 3. At this time, when the scanning signal is input to the row electrodes 41a from the control unit 5 at the first scanning interval t1, the pixels d, g, and j are selectively turned on. Similarly, the pixel h is selectively turned on at the second scanning interval t2, and the pixels f, i, and l are selectively turned on at the third scanning interval t3. In this manner, one cycle is completed and then the image is displayed on the display panel P with pixels arranged in a matrix of four columns×three rows (see FIG. 4).

Here, the pixels a to l of the display device 1 are turned on according to the following operation. First, at the time of driving the display device 1, the light according to the light-emitting signal progresses while totally reflecting inside the optical waveguide units 3. In this state, since the light is not emitted from the optical waveguide units 3 to the outside, the pixels a to l are not turned on. Next, when the scanning signal is input to the row electrodes 41 of the addressing units 4 (the voltage is applied), in the optical waveguide units 3, the electric field is generated at the intersections (pixels a to l) of the row electrodes 41 and the column electrodes 42. The electric field has the intensity of the electric field that is distributed in parallel or radially so as to be centered about the intersections of the row electrodes 41 and the column electrodes 42. When the electric field is applied to the optical waveguide units 3, the light is scattered on the core layer 31 due to the characteristic of the light scattering liquid crystal 7, the scattered light is emitted to the outside of the optical waveguide units 3 (see FIG. 5). As a result, the light functioning as the image signal is selected on the display panel P, the pixels a to l are turned on, and the image is displayed on the display panel P (see FIG. 4).

Effect of Display Device

In this display device 1, since the light in the optical waveguide units 3 is selected by the light scattering operation, it is possible to improve the viewing angle characteristic or brightness characteristic of the display panel P, as compared to the conventional display device 1 in which the light is selected by changing the refractive index of the optical waveguide unit. In addition, the light scattering liquid crystal can be driven at a low voltage, it is possible to achieve a low cost display device since the driver IC has low power consumption and a withstanding voltage. Therefore, the display device 1 can be applied to the display device driven by a battery, such as a portable apparatus.

In addition, since the display device 1 is composed of the fiber-shaped member in which all the optical waveguide units 3 and the addressing units 4 (piezoelectric fiber 43) constituting the display panel P have flexibility, the display panel P has a structure that the display panel P can be rolled and elongated. In other words, the display device 1 has a structure that the display device 1 may be rolled so as to be small in size to be received, and when using it, the display device 1 may be elongated to become larger in size. In other words, the display device functions as a rollup display. Particularly, the rollup display has not been applied to conventional display devices, such as the liquid crystal display device, the organic EL display device and the electrophoresis display device, due to the technical difficulty that the conventional display devices need active elements. Therefore, the display device 1 according to the present invention has an inventive structure.

In addition, since the display panel P of the display device 1 has a simple structure as compared to that of the conventional display device disclosed in Japanese Unexamined Patent Application Publication No. 59-148030, (1) the processing of connecting the row electrode 41 and the control unit 5 and (2) the formation of the core layer 31 of the optical waveguide units 3 can be easily performed. Therefore, the display device 1 of the present invention has an advantage in that the manufacturing cost of the product can be reduced and the product can be produced in large quantities, as compared to the conventional display device.

Further, according to the display device 1, the addressing technology is provided, in which the light functioning as the image signal is selected from inside the fiber-shaped optical waveguide units 3. The addressing technology is newly proposed in the present invention, without being known in the conventional art. Therefore, the display device 1 has an advantage in that the display panel P composed of the fiber-shaped optical waveguide units 3 can be put to practical use.

Additional Function

Figure 6A:
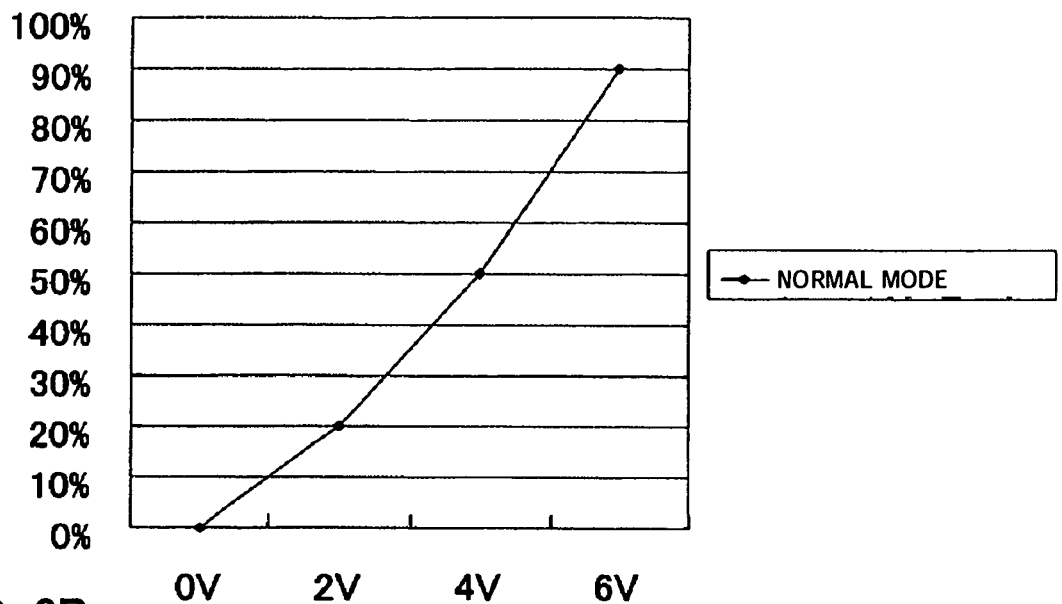
FIGS. 6A and B are explanatory diagrams illustrating characteristics of light scattering liquid crystal constituting an optical waveguide unit.
Figure 6B:
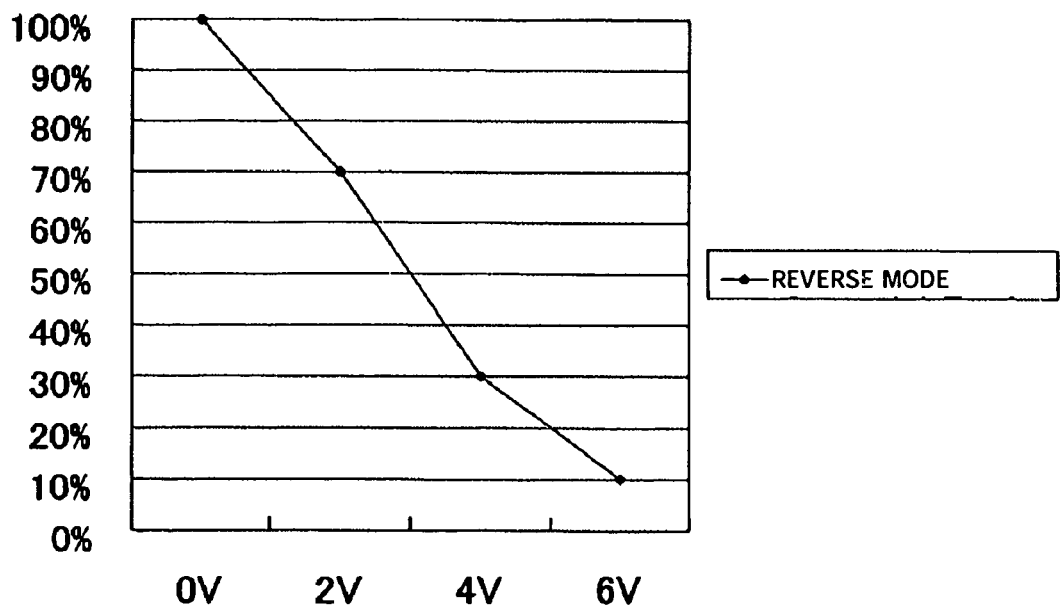

FIG. 6 is an explanatory diagram illustrating the characteristic of the light scattering liquid crystal 7 constituting the optical wave guide unit. The display device 1 uses the light scattering liquid crystal 7 for performing the light-scattering operation by the applied electric field (a normal mode, see FIG. 6A). In addition, the display device 1 does not need the alignment film or polarizer and is configured in the normal mode which a general reflective liquid crystal display device employs. As a result, the display device 1 is preferable since the manufacturing thereof is easy. At the time of driving the display device 1, the complementary voltage application is necessary, and the selected part is in a state in which the voltage is not applied and the non-selected part needs to become a state in which the voltage is applied. However, the present invention is not limited thereto and the type that when the electric field is not applied, the light scattering liquid crystal 7 performs the light scattering operation and when the electric field is applied, the light scattering liquid crystal 7 performs the light transmitting operation may be used (reverse mode, see FIG. 6B). Thereby, since the light can be scattered at the desired position, the display device 1 is preferable since the light can be more accurately selected from the light waveguide units 3. In addition, the light scattering liquid crystal 7 with the reverse mode is constructed by changing the mixing ratio of the polymer Po and the liquid crystal molecule LC. An essential factor of the present invention changes the refractive index of any region using the optical anisotropy of the liquid crystal to thus switch the states of light scattering and light transmission. The invention does not limit the type of the scattering display mode of the liquid crystal.

In addition, the display device 1 uses line-sequential driving method as the driving method. Thereby, for example, since the request is alleviated for the CR time constant of the wiring line to which the voltage is applied, the frequency can be lowered. However, the present invention is not limited thereto, and a point-sequential driving method represented as a CRT (cathode ray tube) may be used as the driving method, if desired.

In addition, the display device 1 may be configured such that the light-emitting unit 2 has the light-emitting elements 21 related to the light of the three primary colors such as red light, green light, and blue light and the light is incident into the light waveguide units 3. Thereby, it is possible to achieve color display (full color display) of the display device 1.

Figure 7A:
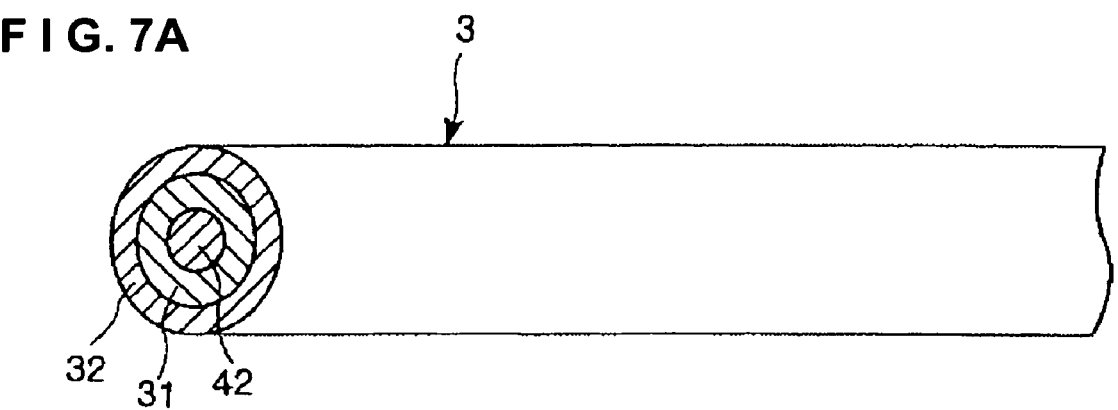
FIGS. 7A and B are diagrams illustrating a modification example of the column elements of the display device shown in FIG. 2.
Figure 7B:
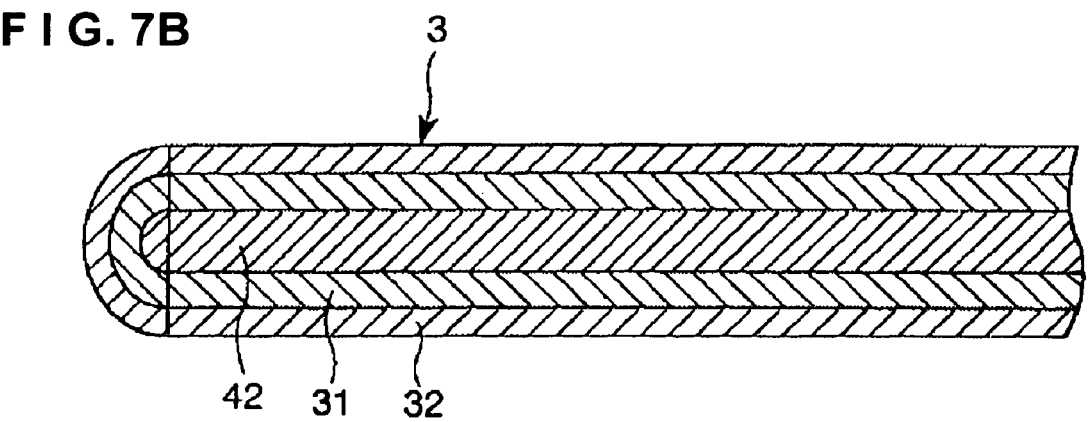

In addition, FIG. 7 is a diagram illustrating a modification example of the column element of the display device shown in the FIG. 2. FIG. 7A is a perspective view illustrating the column element and FIG. 7B is a cross-sectional view of the column element. In the above-mentioned display device 1, the column element on the display region is a substantially square pillar shape, and the column electrodes 42 of the addressing units 4 are arranged on the surface of the light waveguide units 3 (see to FIGS. 1 and 2). Meanwhile, in the modification example, the column electrodes 42 for addressing are buried in the central shaft of the optical waveguide units 3 (for example, general optical fiber). In other words, according to the modification example, each optical waveguide unit 3 is composed of a fiber-shaped member having the substantially cylinder shape and the column electrodes 42 of the addressing units 4 are provided in the core layer 31 of each optical waveguide unit 3. With the above-mentioned structure, there is an advantage in that the manufacturing of the column element is easy. In addition, the column electrodes 42 are made of a conductive material such as platinum or carbon fiber.

Figure 8A:
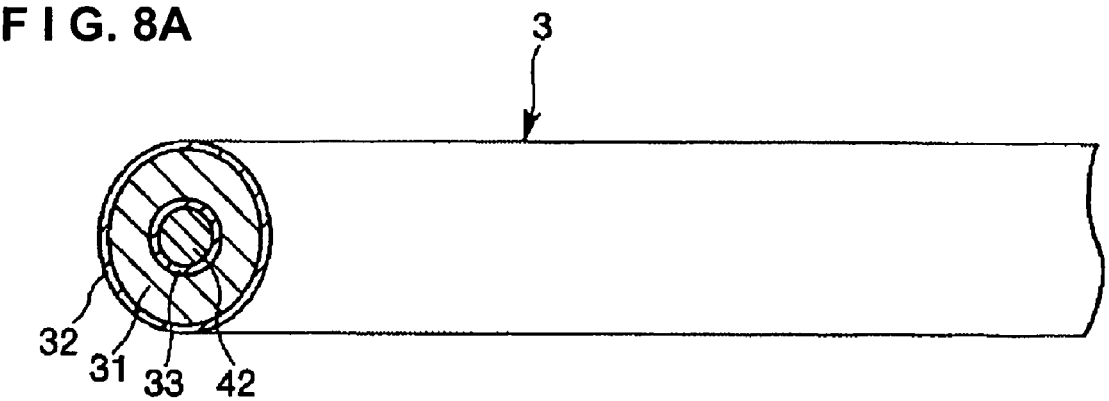
FIGS. 8A and B are diagrams illustrating a modification example of the column elements of the display device shown in FIG. 7.
Figure 8B:
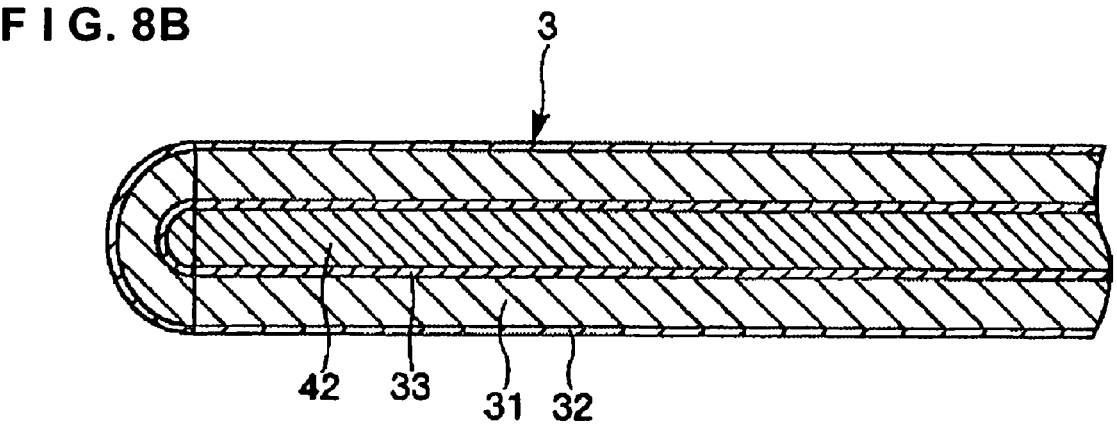

In addition, FIG. 8 is a diagram illustrating a modification example related to the column element of the display device shown in FIG. 7. FIG. 8A is a perspective view illustrating the column element and FIG. 8B is a cross-sectional view of the column element. According to the modification example, in the column element of the display device 1 shown in FIG. 7, an inner clad layer 33 is formed on the circumference of the column electrode 42. According to this configuration, the light incident into the optical waveguide units 3 progresses in the optical waveguide units 3 while surely totally reflecting between the clad layer 32 and the inner clad layer 33. Thereby, as compared to the modification example of FIG. 7, the transmission loss of the light can be reduced in the optical waveguide units 3.

In addition, FIG. 9 is a diagram illustrating a modification example of the display device shown in FIG. 1. According to the modification example, the column elements 3 and 42 are used as warps, the row element 41 is used as a weft, and the warp and the weft are woven by plain weaving. As a result, the display panel P of the display device 1 is formed. According to the structure, since the existing advanced infra in the field of a fiber technology can be used in manufacturing the display panel P, the display panel P can be manufactured with more accuracy and low cost, as compared to the conventional display device. In addition, the column elements 3 and 42 and the row element 41 can be precisely arranged to thus constitute the display panel P. In particular, in the display device 1, since all of the optical waveguide units 3 and the addressing units 4 constituting the display panel P are composed of fiber-shaped members, the formation of the display panel P by plain weaving can be easily achieved. Thereby, there is an advantage in that a method of manufacturing a novel display device 1 (display panel P) can be provided. In addition, in the display device 1, since the display panel P can be manufactured through the same process as that of existing fabric, there is an advantage in that a large area display panel P can be formed without restricting the area of the display region.

Figure 10:
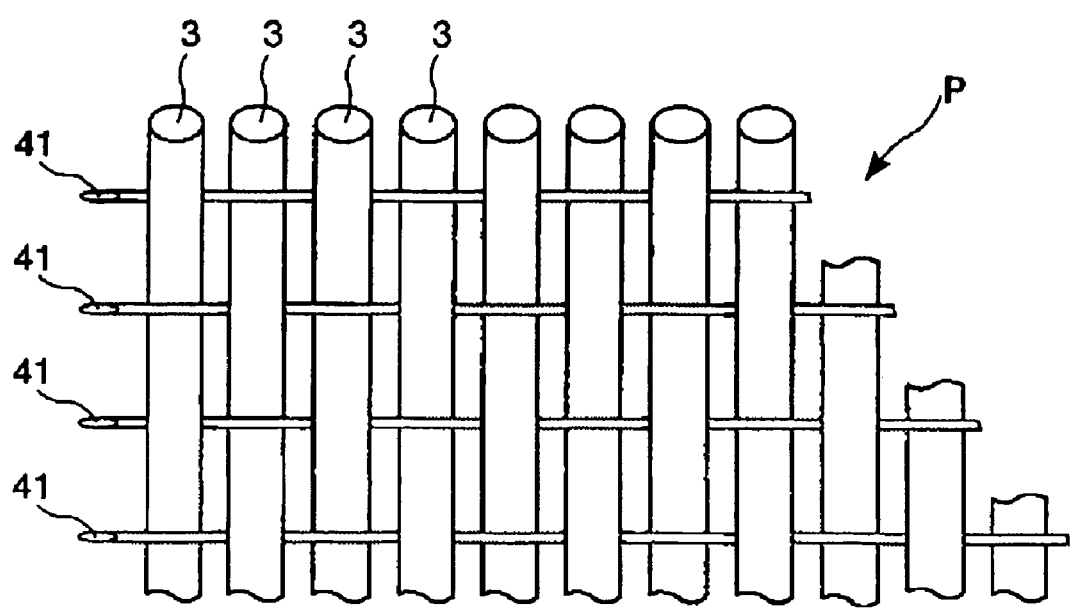
FIG. 10 is a diagram illustrating a modification example of the display device shown in FIG. 9.

In addition, FIG. 10 is a diagram illustrating a modification example of the display panel shown in FIG. 9. According to the modification example, there is a dimension difference between the diameters of the warp (column elements 3 and 42) and the weft (row element 41). In other words, when the diameters of the warp and the weft are the same, the optical waveguide units 3 functioning as the warp is covered up by the weft, there is a fear that the display performance of the display panel P is deteriorated. In the modification example, since the diameter of the weft is smaller than that of the warp, the covered area of the warp is reduced, so that there is an advantage in that the display performance of the display panel can be improved.

Figure 11:
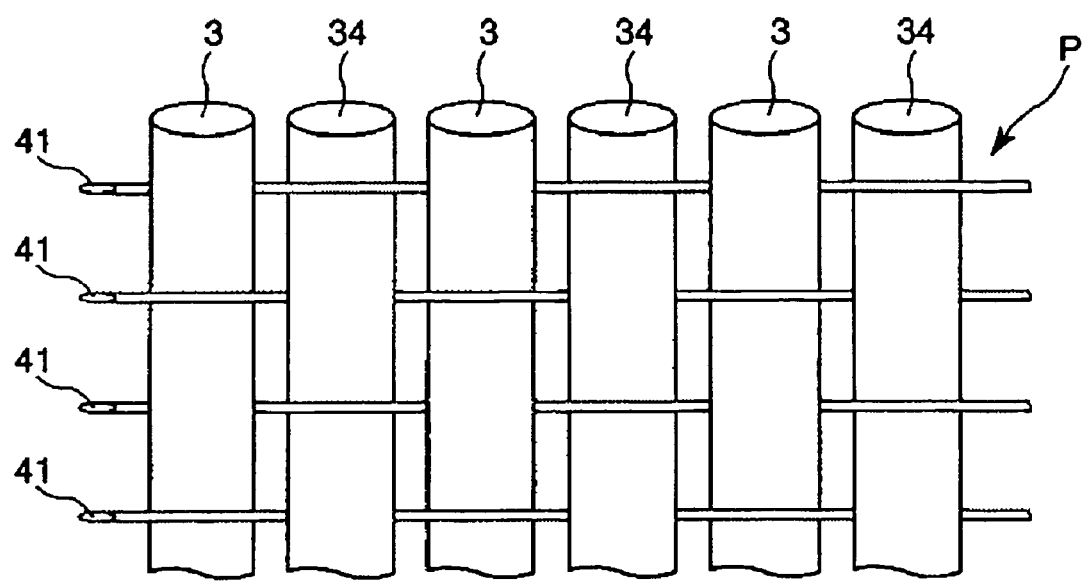
FIG. 11 is a diagram illustrating a modification example of the display device shown in FIG. 10.

In addition, FIG. 11 is a diagram illustrating a modification example of the display device shown in FIG. 10. In the modification example, dummy fibers 34 are further inserted between the warps (column elements 3 and 42) to be woven. The light from the light-emitting elements 21 is not incident on the dummy fibers 34. According to the structure, since the warps are arranged at a predetermined gap between the dummy fibers 34, the pixels a to l on the display panel P are arranged with excellent balance. Thereby, it is possible to suppress the display unevenness (generation of the difference of the brightness) caused by covering the warp with the weft (row element 41).

In addition, FIG. 12 is a diagram illustrating a modification example of the display devices shown in FIGS. 9 to 11. According to the modification example of the display devices shown in FIGS. 9 to 11, since the display panel P is formed by weaving the warps (column elements 3 and 42) and the weft (row element 41) through plain weaving, a plurality of interfaces between the display panel and air exist on the surface of the display panel. According to the structure, the light from the exterior is easily reflected (scattered) on the optical waveguide units 3 of the display panel P or the interface of the addressing units 4. In this case, the reflected light and the light of the video signal (light selected from the pixels a to l) overlap each other to thus increase an OFF level of the display device 1, so that the contrast of the display image may be deteriorated. In regard of this point, in the display device 1, a filling material 6 other than the transparent resin material is filled on the interface of the display panel P. In other words, a surface of the display panel P of the display device 1 is covered with the filling material 6. Thereby, since the number of interfaces of the display region is reduced so that the scattering of the light is suppressed, it is possible to improve the display quality (contrast, uniformity of the brightness, visibility and the like) of the display device 1.

In addition, in the modification example shown in FIG. 12, the filling material 6 is applied by a roller 61 to be filled onto the display area. In addition, it is preferable that the filling material 6 have a refractive index approximate to that of the clad layer 32 of the optical waveguide units 3. Thereby, it is possible to improve the display performance. In addition, it is preferable that the filling material 6 be composed of a resin material having flexibility to some extent after the curing process is performed. Thereby, in the display device 1, the display panel P can be flexibly rolled up to be accommodated.

Figure 13:
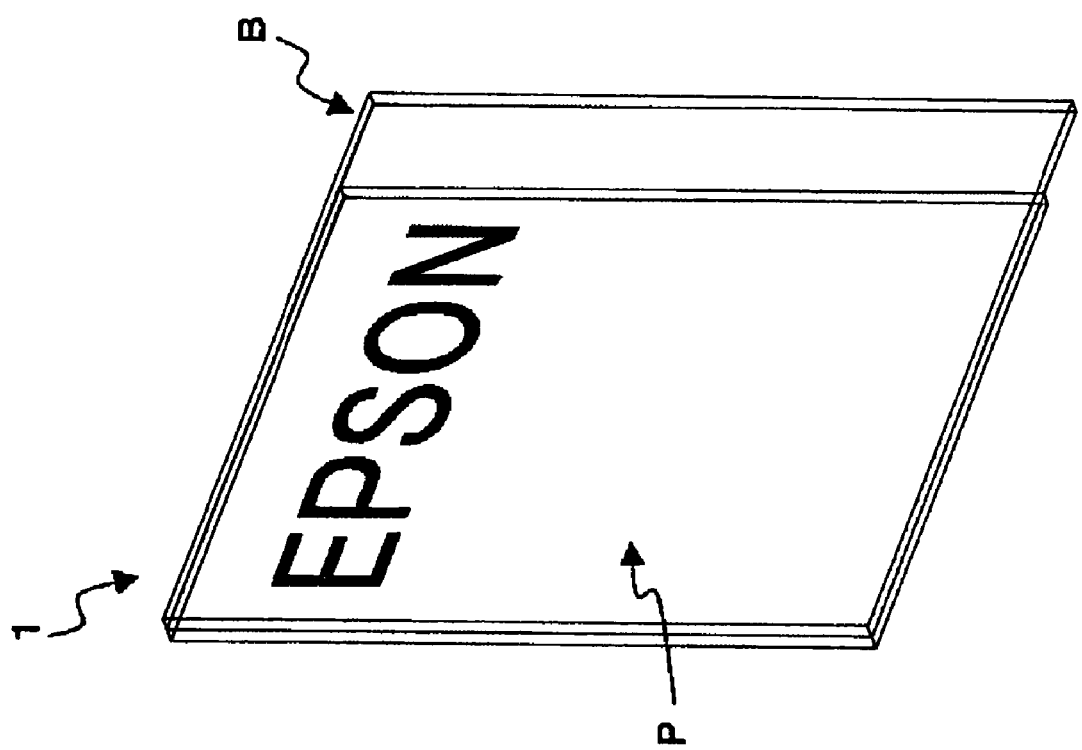
FIG. 13 is a diagram illustrating a modification example of the display device shown in FIG. 1.

In addition, FIGS. 13 and 14 are diagrams illustrating a modification example of the display device shown in FIG. 1. In addition, FIGS. 15 and 16 are explanatory diagrams illustrating the driving control of the back surface layer shown in FIGS. 13 and 14. In the modification example, the display panel P of the display device 1 has a transparent structure and a back surface layer B is arranged on the back surface of the display panel P. The back surface layer B is formed by filling the liquid material into the plate-shaped cell and the state of the plane of the back surface layer B can be switchable between a transparent state and a light absorbing state (black state). The back surface layer B is arranged on the back surface of the display panel P and the display is performed on the front surface of the display panel P. As a result, the additional function as the display device 1 can be increased. In addition, in the display panel P having the transparent structure, its constituent elements 3 and 4 are composed of the transparent material.

Here, in the back surface layer B shown in FIGS. 13 to 16, for example, TN (Twisted Nematic) liquid crystal is employed. The TN liquid crystal serves as a light shutter by the polarization operation and the rotary polarization operation (see FIGS. 15 and 16). Specifically, when the power supply of the back surface layer B is turned off (see FIG. 15A and FIG. 16A), the back surface layer B becomes a transparent state since the light can transmit the back surface layer B. On the other hand, when the power supply of the back surface layer B is turned on (see FIG. 15B and FIG. 16B), the back surface layer B becomes a light absorbing state since the light can not transmit the back surface layer B. As such, in the display device 1, the power supply can be turned on and turned off, so that the characteristic of the back surface layer B can be easily changed.

According to the modification example shown in FIGS. 13 to 16, since the characteristic of the back surface layer B can be changed so that the plurality of functions can be applied to the display device 1, proper functions according to various scenes can be selected through one display device 1. In addition, in the modification example, when the back surface layer B is in a transparent state, the display device 1 serves as a head-up display. Thereby, since the image of the display device 1 is displayed with the image overlapping the background, it is possible to reduce the movement of a visual point or a blind area of a user who uses the display device 1. On the other hand, in the modification example, when the back surface layer B is in the optical absorbing state, the light incident on the display panel P from the exterior is absorbed by the back surface layer B. Thereby, since the reflected light (light scattering) is reduced on the display region, it is possible to improve the display quality (contrast, uniformity of the brightness, visibility and the like) of the display device 1. In the modification example, the TN liquid crystal is used, but an optical element other than the TN liquid crystal may be used in the optical element functioning as the light shutter.

Second Embodiment

Structure of Display Device

Figure 17:
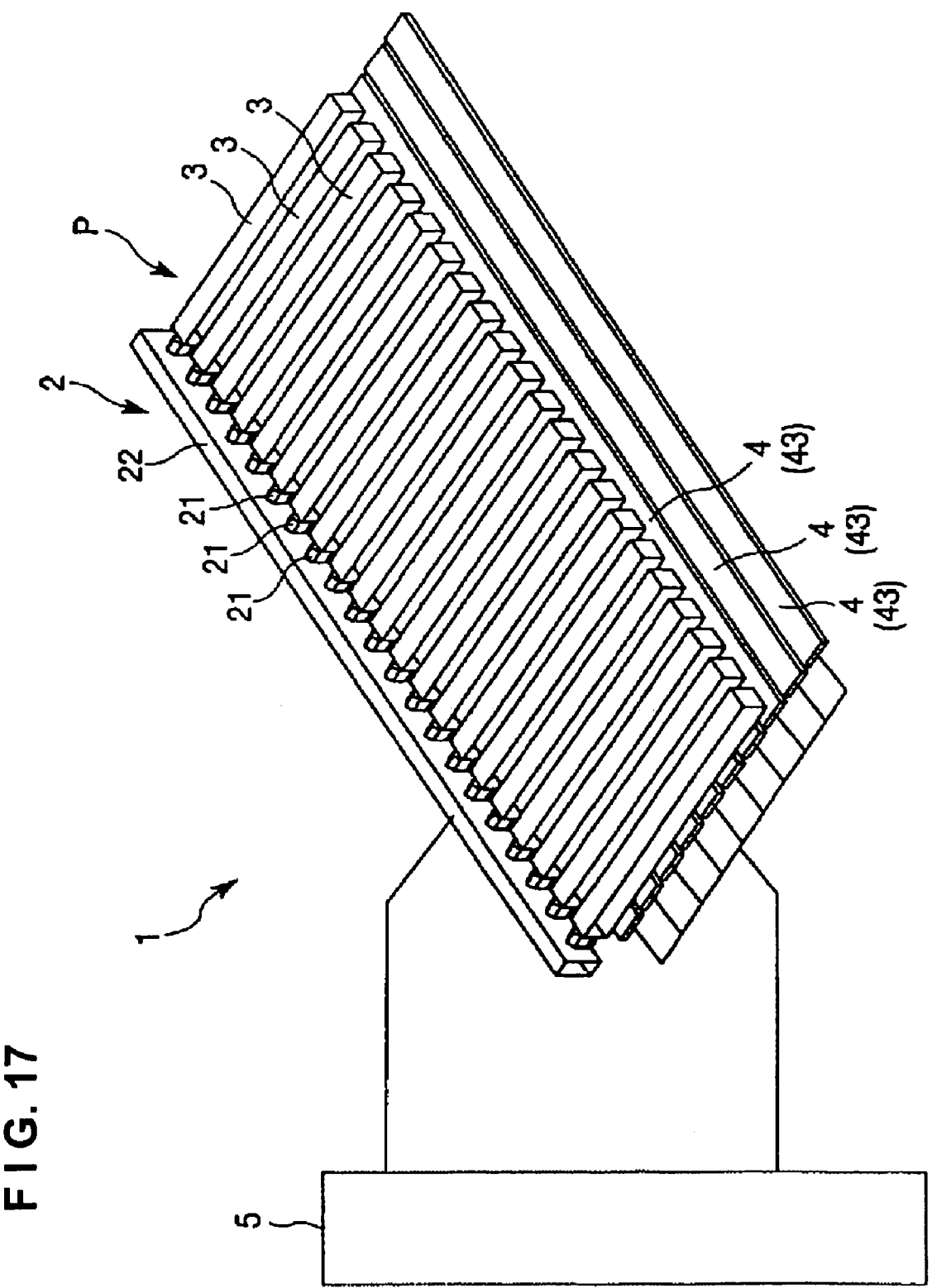
FIG. 17 is a perspective diagram illustrating a display device according to a second embodiment of the present invention.

FIG. 17 is a perspective diagram illustrating a display device according to a second embodiment of the present invention. FIG. 18 is a diagram illustrating the column element of the display panel shown in FIG. 17. FIG. 18A is a perspective diagram of the column element (optical waveguide unit 3) and FIG. 18B is a cross-sectional view of the column element. In addition, FIG. 19 is a diagram illustrating the row element of the display panel shown in FIG. 17. FIG. 19A is a perspective diagram of the row element (addressing unit 4) and FIG. 19B is a cross-sectional view of the row element. In the drawings described above, constituent elements of the display device 1 of the first embodiment, which are the same as those of the first embodiment, are denoted by the same reference numerals, and a description thereof is omitted. In the display device 1, each addressing unit (the column element of the display panel P) 4 is composed of the piezoelectric fiber 43 having the row electrode 41 for addressing therein, and the light serving as the image signal is selected from the optical waveguide units 3 through the mechanical vibration of the piezoelectric fiber 43.

The piezoelectric fiber 43 of the addressing units 4 is composed of the row electrode 41, the piezoelectric layer 44 and the external electrode 45 (see FIG. 19). The piezoelectric layer 44 is made of a piezoelectric material that expands and contracts by applying voltage and is formed so as to cover the circumference of the row electrode 41. The external electrode 45 covers the circumference of the piezoelectric layer and faces the row electrode 41. In addition, the external electrode 45 is connected to a ground.

In the addressing units 4, when the voltage is applied to the row electrode 41 according to the predetermined display data, the piezoelectric layer 44 vibrates and the vibration is transmitted to the optical waveguide units 3. Thereby, by the below-described operation, the light in the light waveguide units 3 is emitted from the intersection of the addressing units 4 and the optical waveguide units 3 and the light serving as the image signal is selected.

In addition, in the display device 1, each addressing unit 4 has a plate shape, however, it is not limited thereto, and may have a substantially circular pillar shape (see FIG. 20). In addition, it is preferable that the outside of the addressing units 4 be covered with an insulating material (not shown).

Operation of Display Device

Figure 22:
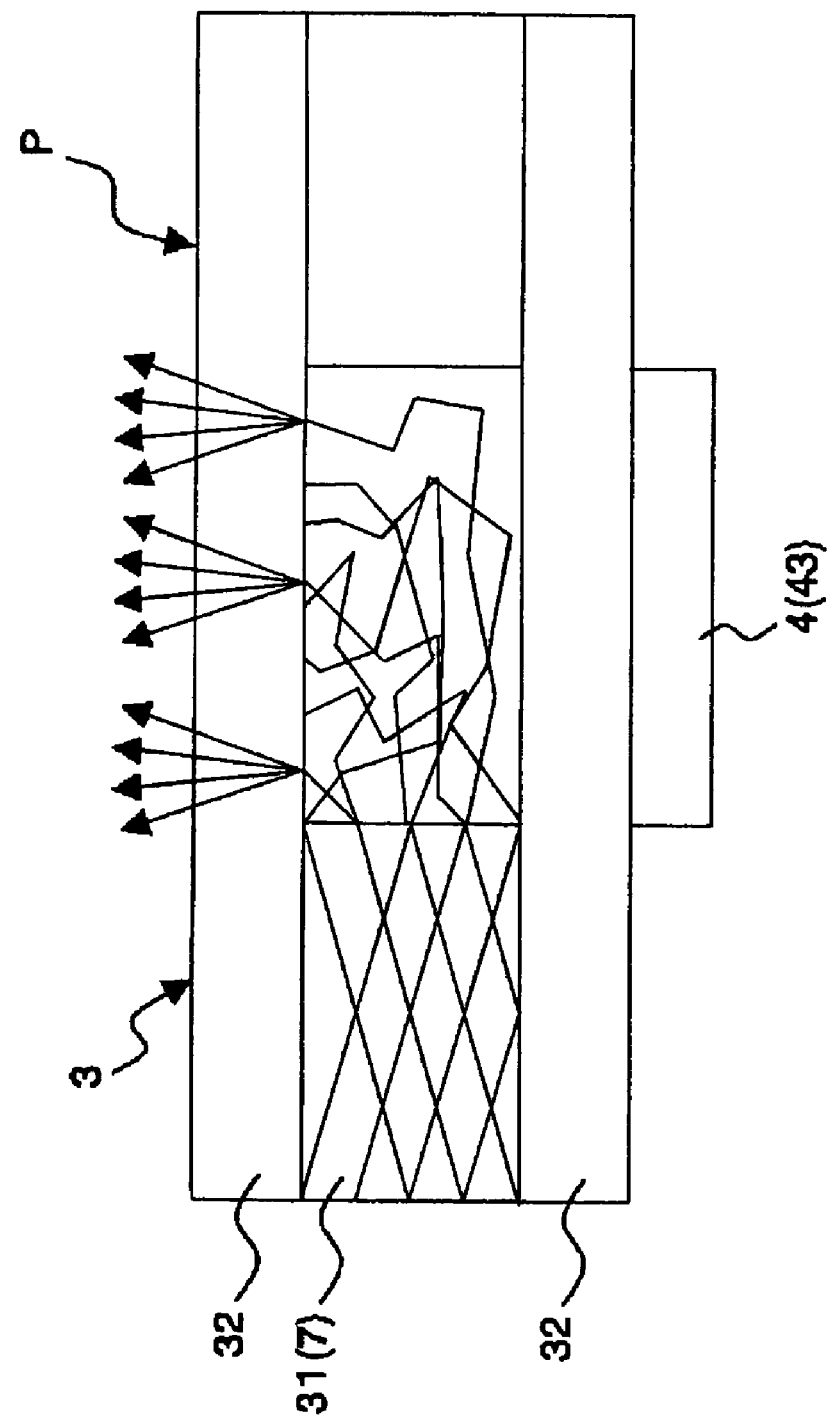
FIG. 22 is an explanatory diagram illustrating the operation of the display device shown in FIG. 17.

FIGS. 21 and 22 are explanatory diagrams illustrating the operation of the display device shown in FIG. 17. In the display device 1, the pixels a to l of the display panel P are turned on according the following operation. First, at the time of driving the display device 1, in the optical waveguide units 3, the light related to the light-emitting signal progresses while totally reflecting inside the optical waveguide units 3. In this state, since the light is not leaked from the optical waveguide units 3 to the outside, the pixels a to l are in a turn-off state. Next, the scanning signal is input to the row electrode 41 of the addressing units 4 (piezoelectric fiber 43) (when the voltage is applied), the piezoelectric layer 44 vibrates, and the vibration is transmitted to the intersections (pixels a to l) of the optical waveguide units 3 and the addressing units 4. If so, in the optical waveguide units 3, the light is scattered on the core layer 31 by the operation and characteristic of the light scattering liquid crystal 7, and the scattered light is emitted to the outside of the optical waveguide units 3. Thereby, the light serving as the image signal is selected on the display panel P, the pixels a to l are turned on, and the image is displayed on the display panel P (see FIG. 21).

Effect of Display Device

In the display device 1, each addressing unit 4 is composed of the piezoelectric fiber 43 and by the mechanical vibration of the addressing unit 4, the light serving as the image signal is selected from the optical waveguide units 3. Thereby, it is possible to simplify the structure of the display device.

Third Embodiment

Figure 23:
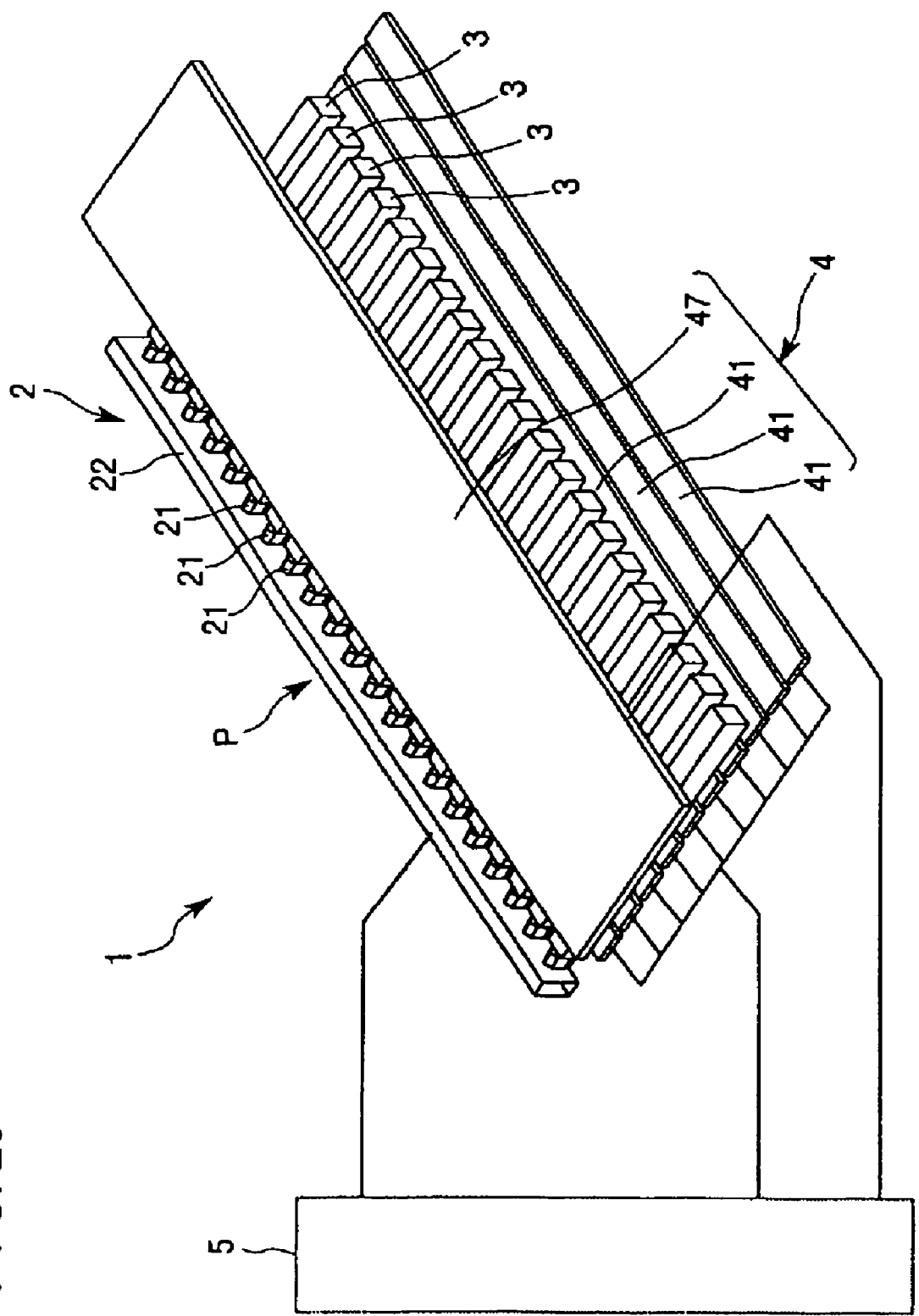
FIG. 23 is a perspective diagram illustrating a display device according to a third embodiment of the present invention.
Figure 24:
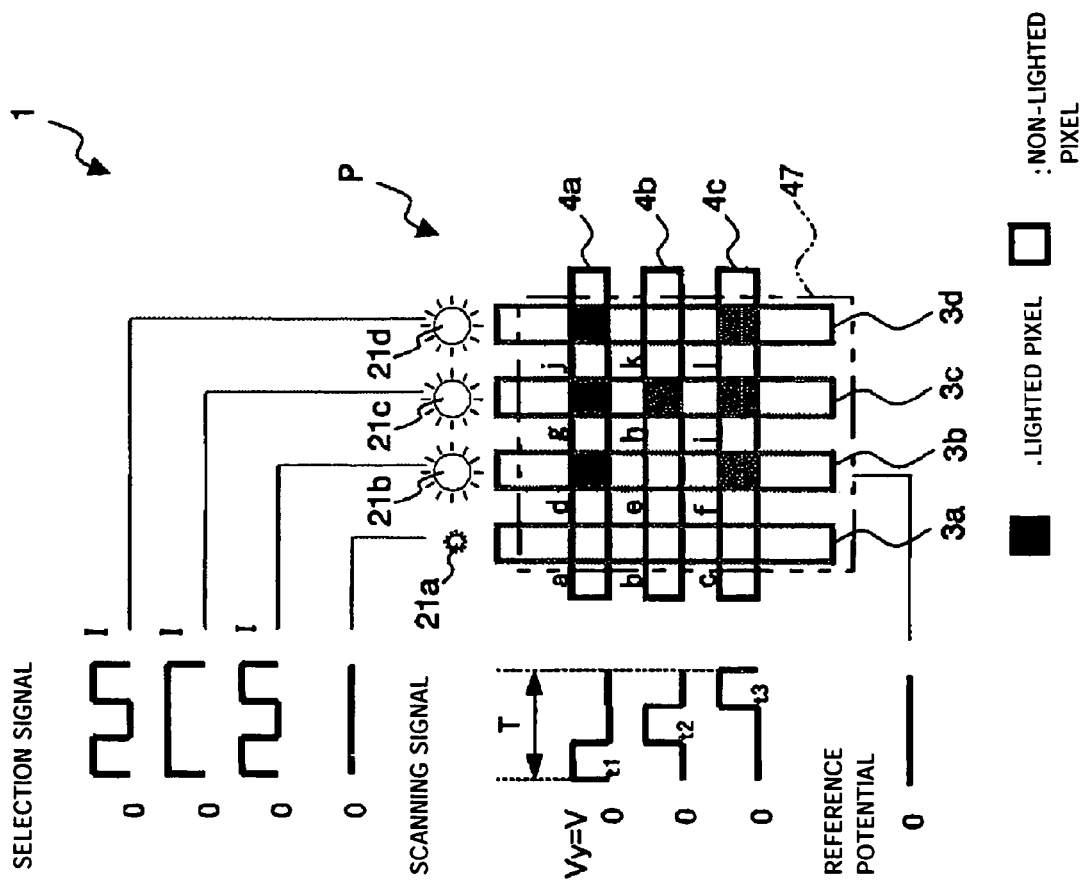
FIG. 24 is an explanatory diagram illustrating the operation of the display device shown in FIG. 23.

FIG. 23 is a perspective diagram illustrating a display device according to a third embodiment of the present invention. FIG. 24 is an explanatory diagram illustrating the operation of the display device shown in FIG. 23. In FIGS. 23 and 24, constituent elements of the display device 1 of the third embodiment, which are the same as those of the first embodiment, are denoted by the same reference numerals, and a description thereof is omitted. In the display device 1 according to the third embodiment, a single column electrode 47, which is obtained by combining a plurality of column electrodes, is arranged, in place of the plurality of column electrodes 42 shown in FIG. 1.

The column electrode 47 is composed of a transparent conductive material and is arranged over substantially the entire surface of the display panel P (see FIGS. 23 and 24). In addition, the column electrode 42 has flexibility and can be bent and rolled up. In addition, since the operation and relationship between the column electrode 47, the row electrode 42 and the optical waveguide units 3 are the same as those of the first embodiment, a description thereof is omitted.

In addition, it is preferable that the column electrode 47 be simultaneously formed on the optical waveguide units 3. Thereby, it is possible to simplify the manufacturing process of the column electrode 47.

Fourth Embodiment

Figure 25:
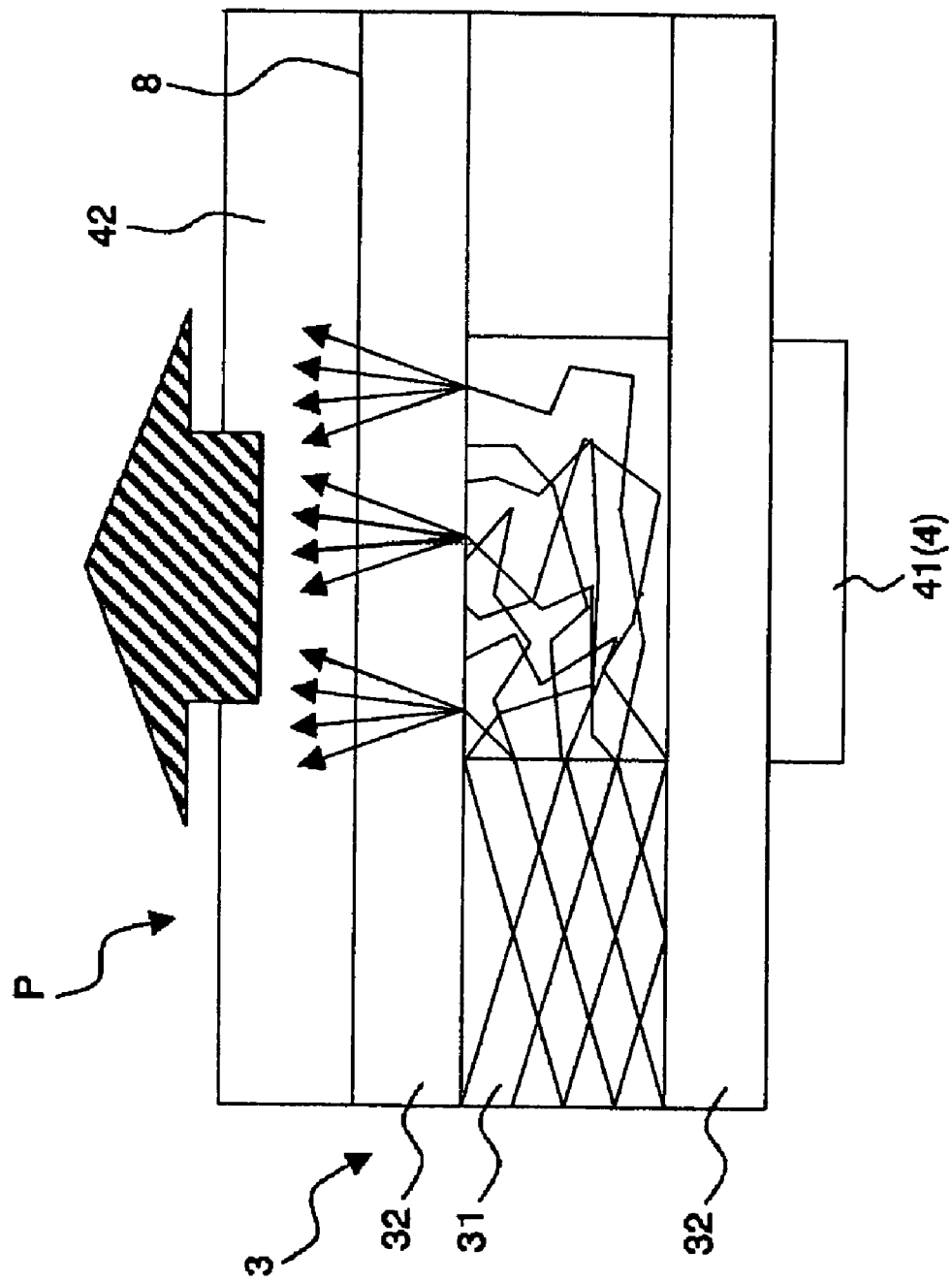
FIG. 25 is an explanatory diagram illustrating the structure or operation of a display device according to a fourth embodiment of the present invention.

FIG. 25 is an explanatory diagram illustrating the structure and operation of a display device according to the fourth embodiment of the present invention. In FIG. 25, constituent elements of the display device 1 of the fourth embodiment, which are the same as those of the first embodiment, are denoted by the same reference numerals and a description thereof is omitted. In the display device 1, a fluorescent layer 8 is arranged on the pixels a to l of the display panel P. The light emitted from the light-emitting element 21 serves as exciting light and applies the energy for obtaining predetermined fluorescent light to the fluorescent layer 8.

The fluorescent layer 8 is composed of the fluorescent materials of the three primary colors such as red, green and blue, and the fluorescent material of any one color of the three primary colors is arranged on each of the pixels a to l of the display panel P (see FIG. 25 and FIG. 4). Thereby, it is possible to achieve color display by a different technique than the technique of the display device 1. In addition, by arranging the fluorescent layer 8, it is possible to improve the visibility of the display panel P through the fluorescent operation (residual image operation).

In addition, according to the present embodiment, the fluorescent layer 8 is arranged between the clad layer 32 and the column layer 42 (see FIG. 25). In order to make the difference between the electrodes shorter, make the intensity of the applied electric field stronger and make the applied voltage smaller, the fluorescent layer 8 may be arranged on the outside of the clad layer 32 and the column electrode 42. In FIGS. 5 and 6, the fluorescent layer 8 is arranged on the outside of the clad layer 32. In addition, the color of the fluorescent layer 8 is not limited to three colors. Therefore, by arranging the fluorescent layer 8 of any color, it is possible to properly change the color of the display image.

As mentioned above, although the display device of the present invention is described with reference to the accompanying drawings, the present invention is not limited thereto. In the present invention, the constituent elements may be substituted with other constituent elements having the same functions. In addition, the present invention may comprise additional constituent elements.

In addition, the present invention may be one obtained by combining two or more structures (aspects) among the respective embodiments.

What is claimed is:

1. A display device comprising:
a display panel having a light-emitting unit for emitting light according to predetermined display data;
an elongated optical waveguide unit that is arranged on a plane of a surface of a display region of the display panel, wherein the elongated optical waveguide unit is straight and has a side face, a front face at a first end, a back face at a second end, and a core layer; and
an addressing unit for selecting the light from the light waveguide unit according to the predetermined display data,
wherein the core layer includes a light scattering liquid crystal,
wherein the light emitted from the light-emitting unit directly enters the elongated optical waveguide unit through the front face,
wherein the addressing unit has a column electrode and a row electrode, wherein the column electrode is provided in the core layer of the elongated optical waveguide unit, wherein the elongated optical waveguide unit and the row electrode are weaved with each other, wherein the elongated optical waveguide unit has a greater diameter than the row electrode,
wherein the addressing unit allows the entered light to be emitted from the side face at a predetermined part of the optical waveguide unit by using a light scattering operation of the light scattering liquid crystal and the emitted light from the side face is displayed at the display region,
wherein between the front face and the predetermined part a) the entered light travels through the elongated optical waveguide unit while totally reflecting inside the elongated optical waveguide unit and b) the elongated optical waveguide unit exclusively provides all travel paths for the entered light.

2. The display device according to claim 1, wherein a back surface layer for absorbing light is provided on a back surface of the display panel.

3. The display device according to claim 1,
wherein a back surface layer is provided on a back surface of the display panel; and
the back surface layer is constructed so as to select at least one of:
a transmitting state that transmits the light incident on the display panel from the outside; and
an absorbing state that absorbs the light incident on the display panel from the outside.

4. The display device according to claim 1,
wherein the optical waveguide unit has a clad layer covering the circumference of the core layer.

5. The display device according to claim 1,
wherein the addressing unit is multiplex driven.

6. The display device according to claim 1,
wherein the light-emitting unit allows a red light component, a green light component, and a blue light component to be incident on the optical waveguide unit.

7. The display device according to claim 1,
wherein a fluorescent layer having a fluorescent material is provided on at least a part of the display panel from which the light is selected.

8. A display device comprising:
a display panel having a light-emitting unit for emitting light according to predetermined display data;
a plurality of elongated optical waveguide units that are arranged on a plane of a surface of a display region of the display panel, wherein the plurality of elongated optical waveguide units each are straight and each have a side face, a front face at a first end, a back face at a second end, and a core layer; and
an addressing unit for selecting the light from the light waveguide units according to the predetermined display data,
wherein the core layer includes a light scattering liquid crystal,
wherein the light emitted from the light-emitting unit directly enters each of the plurality of elongated optical waveguide units through the front face of the elongated optical waveguide unit,
wherein the addressing unit has a plurality of column electrodes and a plurality of row electrodes, wherein each of the plurality of column electrodes is provided in the core layer of one of the plurality of elongated optical waveguide units, wherein the plurality of elongated optical waveguide units and the plurality of row electrodes are weaved with each other, wherein each of the plurality of elongated optical waveguide units has a greater diameter than each of the row electrodes,
wherein the addressing unit allows the entered light to be emitted from the side face at a predetermined part of each of the plurality of optical waveguide units by using a light scattering operation of the light scattering liquid crystal and the emitted light from the side face is displayed at the display region,
wherein between the front face and the predetermined part of each of the plurality of elongated optical waveguide units a) the entered light travels through the elongated optical waveguide unit while totally reflecting inside the elongated optical waveguide unit and b) the elongated optical waveguide unit exclusively provides all travel paths for the entered light.

9. The display device according to claim 8,
wherein the plurality of optical waveguide units and at least part of the addressing unit are arranged in a matrix.

10. The display device according to claim 8,
wherein the plurality of optical waveguide units and at least part of the addressing unit are arranged in a fabric shape.

11. The display device according to claim 10,
wherein a surface of the display panel is covered with a transparent material.

12. The display device according to claim 8,
wherein a back surface layer for absorbing light is provided on a back surface of the display panel.

13. The display device according to claim 8,
wherein a back surface layer is provided on a back surface of the display panel; and
the back surface layer is constructed so as to select at least one of:
- a transmitting state that transmits the light incident on the display panel from the outside; and
- an absorbing state that absorbs the light incident on the display panel from the outside.

14. The display device according to claim 8,
wherein the optical waveguide units have a clad layer covering the circumference of each core layer.

15. The display device according to claim 14 further comprises a filling material that is disposed in an interface on the surface of the display panel and between the display panel and air.

16. The display device according to claim 15, wherein the filling material has a refractive index approximate to that of the clad layer.

17. The display device according to claim 16 further comprises a plurality of dummy fibers inserted between the plurality of elongated optical waveguide units.

18. The display device according to claim 8,
wherein the addressing unit is multiplex driven.

19. The display device according to claim 8,
wherein the light-emitting unit allows a red light component, a green light component, and a blue light component to be incident on the optical waveguide units.

20. The display device according to claim 8, wherein a fluorescent layer having a fluorescent material is provided on at least a part of the display panel from which the light is selected.

* * * * *